United States Patent
Benson et al.

(10) Patent No.: US 9,553,528 B2
(45) Date of Patent: Jan. 24, 2017

(54) MOTOR CONTROL FOR STABILITY AND POWER SUPPLY PROTECTION

(71) Applicant: The Boeing Company, Chicago, IL (US)

(72) Inventors: Christopher Pete Benson, Berkeley, CA (US); Douglas C. Cameron, Ladera Ranch, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/801,398

(22) Filed: Jul. 16, 2015

(65) Prior Publication Data

US 2015/0326154 A1 Nov. 12, 2015

Related U.S. Application Data

(63) Continuation of application No. 14/096,614, filed on Dec. 4, 2013, now Pat. No. 9,136,782, which is a
(Continued)

(51) Int. Cl.
*H02P 6/00* (2016.01)
*H02P 23/14* (2006.01)
(Continued)

(52) U.S. Cl.
CPC ............... *H02P 6/002* (2013.01); *B60L 1/00* (2013.01); *H02H 7/085* (2013.01); *H02H 7/0838* (2013.01); *H02H 7/0844* (2013.01); *H02H 7/12* (2013.01); *H02M 1/00* (2013.01); *H02P 6/00* (2013.01); *H02P 6/085* (2013.01); *H02P 6/28* (2016.02); *H02P 9/006* (2013.01); *H02P 9/10* (2013.01);
(Continued)

(58) Field of Classification Search
CPC ...................................................... H02P 6/002
USPC .......... 318/139, 400.22, 400.21, 400.01, 700
See application file for complete search history.

(56) References Cited

U.S. PATENT DOCUMENTS

| | | |
|---|---|---|
| 4,368,411 A | 1/1983 | Kidd |
| 4,528,486 A | 7/1985 | Flaig et al. |
| | (Continued) | |

FOREIGN PATENT DOCUMENTS

| | | |
|---|---|---|
| EP | 0596472 A2 | 5/1994 |
| WO | WO2011149544 A1 | 12/2011 |
| WO | WO2014165502 A1 | 10/2014 |

OTHER PUBLICATIONS

International Search Report and Written Opinion, dated Jul. 22, 2014, regarding Application No. PCT/US2014/033532, 15 pages.
(Continued)

*Primary Examiner* — David S Luo
(74) *Attorney, Agent, or Firm* — Yee & Associates, P.C.

(57) ABSTRACT

A method and apparatus for controlling a motor. The motor comprises windings. A switch bridge comprising a plurality of switches is configured to couple a power source to the windings. A motor controller is configured to control the plurality of switches. An undesired condition identifier is configured to identify an undesired condition when the motor is providing power to the power source, wherein the undesired condition is defined with respect to a characteristic of the power source. An undesired condition reducer is configured to reduce the undesired condition in response to identifying the undesired condition by the undesired condition identifier.

23 Claims, 17 Drawing Sheets

Related U.S. Application Data continuation-in-part of application No. 13/933,803, filed on Jul. 2, 2013, now Pat. No. 9,035,584.

(51) Int. Cl.

| | |
|---|---|
| *H02H 7/08* | (2006.01) |
| *H02H 7/085* | (2006.01) |
| *H02H 7/12* | (2006.01) |
| *H02P 9/00* | (2006.01) |
| *H02P 9/10* | (2006.01) |
| *B60L 1/00* | (2006.01) |
| *H02P 27/08* | (2006.01) |
| *H02P 29/02* | (2016.01) |
| *H02M 1/00* | (2006.01) |
| *H02P 6/08* | (2016.01) |

(52) U.S. Cl.
CPC .............. *H02P 23/14* (2013.01); *H02P 25/03* (2016.02); *H02P 25/034* (2016.02); *H02P 27/085* (2013.01); *H02P 29/027* (2013.01); *H02P 29/0241* (2016.02); *H02P 29/032* (2016.02); *H02P 2207/05* (2013.01)

(56) References Cited

U.S. PATENT DOCUMENTS

| | | | |
|---|---|---|---|
| 7,023,163 B2 * | 4/2006 | Charles | ............... H02M 11/00 318/563 |
| 7,164,244 B2 | 1/2007 | Viti | |
| 7,586,285 B2 | 9/2009 | Gunji | |
| 8,511,606 B1 | 8/2013 | Lutke et al. | |
| 8,884,562 B1 | 11/2014 | Cameron | |
| 9,035,584 B2 | 5/2015 | Cameron | |
| 2002/0146617 A1 | 10/2002 | Johnson et al. | |
| 2005/0179463 A1 | 8/2005 | Kasuya et al. | |
| 2008/0275644 A1 | 11/2008 | Macneille et al. | |
| 2014/0354199 A1 | 12/2014 | Zeng et al. | |
| 2015/0008849 A1 | 1/2015 | Benson et al. | |
| 2015/0008854 A1 | 1/2015 | Cameron | |
| 2015/0084558 A1 | 3/2015 | Benson et al. | |
| 2015/0115108 A1 | 4/2015 | Benson et al. | |

OTHER PUBLICATIONS

Partial International Search Report, dated Oct. 9, 2014, regarding Application No. PCT/US2014/045045, 7 pages.

International Search Report and Written Opinion, dated Jan. 14, 2015, regarding Application No. PCT/US2014/045048, 20 pages.

Extended European Search Report, dated Mar. 20, 2015, regarding Application No. 14190508.3, 8 pages.

Jojo, "SCR Applications," Electronic Circuits and Diagram-Electronics Projects and Design, Sep. 15, 2009, 6 pages. http://www.circuitstoday.com/scr-applications.

"SPEED Software," CD-Adapco, 4 pp., accessed Nov. 15, 2011, http://www.speedlab.co.uk/software.html.

"TG100H BLDC Inductor Board," ThinGap Corporation, 1 page, accessed Nov. 15, 2011, http://www.thingap.com/pdf/2011/tg100hbldcindboard.pdf.

Office Action, dated Jan. 29, 2015, regarding U.S. Appl. No. 14/096,614, 18 pages.

Notice of Allowance, dated May 18, 2015, regarding U.S. Appl. No. 14/096,614, 13 pages.

* cited by examiner

MOTOR CONTROL FOR STABILITY AND POWER SUPPLY PROTECTION

This application is a continuation of U.S. patent application Ser. No. 14/096,614, filed Dec. 4, 2013, which is a continuation-in-part of U.S. patent application Ser. No. 13/933,803, filed Jul. 2, 2013, each of which is incorporated by reference herein in its entirety.

BACKGROUND INFORMATION

1. Field

The present disclosure relates generally to electric motors and to the control of electric motors. More particularly, the present disclosure relates to controlling an electric motor to reduce instability when the motor is providing power to a power source and to protect the power source from undesired current levels.

2. Background

Aircraft may employ various electronic devices and systems to perform various functions on the aircraft. For example, without limitation, electric motors on an aircraft may be used to move flight control surfaces, to raise and lower landing gear, and to perform other functions on the aircraft. Power for the electric motors and other electronic systems and devices on an aircraft may be provided by an aircraft power system.

An example of a type of electric motor used on aircraft, and for many other applications, is a brushless DC electric motor. This type of motor is also known as an electronically commutated motor. A brushless DC motor may comprise, for example, a permanent magnet synchronous motor, a switched reluctance motor, or an induction motor. Brushless DC motors are powered by a direct current (DC) electrical power source via an inverter which is controlled to provide a switching power signal to drive the motor.

For example, a brushless DC motor may include permanent magnets which rotate and a fixed armature which comprises the stator windings. An electronic controller continually switches the phase of power provided to the windings to keep the motor turning. The controller may employ a solid state circuit to provide timed power distribution to the motor windings.

To direct the rotor rotation, the controller for a brushless DC motor requires some means of determining the rotor's orientation relative to the stator windings. Some brushless DC motors use Hall effect sensors or a rotary encoder to directly measure the position of the rotor. Others measure the back electromotive force (EMF) in the undriven windings to infer the rotor position. Controllers of this latter type are often called sensorless controllers. Other sensorless controllers are capable of measuring winding saturation caused by the position of the magnets to infer the rotor position.

The controller for a brushless DC motor may provide bi-directional outputs to control the driving of DC power to the motor windings. The outputs may be controlled by a logic circuit. Simple controllers may employ comparators to determine when the output phase should be advanced. More advanced controllers may employ a microcontroller to manage acceleration, control speed, and fine tune-motor efficiency. Motor controllers of this type may be referred to as electronic speed controllers.

A controller may control the power that is provided to the windings of a DC motor by controlling the switches in a switch bridge. The switch bridge couples the DC power source to the windings of the DC motor. For example, a three-phase switch bridge may have six switches arranged to form three parallel half H-bridges for coupling the DC power source to three motor windings of a DC motor. The switches of the switch bridge may be controlled by the controller to drive a current in either direction on each of the motor windings. For example, without limitation, the switch bridge may be implemented using solid state switching devices such as metal-oxide-semiconductor field-effect transistors (MOSFETs).

Various methods may be used to control the switches in a switch bridge to modulate the current in the windings of a brushless DC motor. However, existing methods for modulating the current in the motor windings of a brushless DC motor may have various drawbacks and limitations. A method for controlling the current in the windings of a brushless DC motor that overcomes these drawbacks and limitations is desirable.

The rotor in a brushless DC motor may be controlled to rotate in either direction, clockwise or counter-clockwise. The current in the windings of the motor may be controlled to produce torque on the rotor in either the clockwise or counter-clockwise direction. The current in the windings may be controlled to produce torque on the rotor that is either in the same direction as the direction of rotation of the rotor or in the opposite direction from the direction of rotation of the rotor at a particular point in time.

Operation of a brushless DC motor thus may be described with reference to four quadrants. For example, in a first quadrant of operation, the rotor may be rotating in a clockwise direction and the current in the motor windings may produce torque on the rotor in the same clockwise direction. In a second quadrant of operation, the rotor may be rotating in a counter-clockwise direction and the current in the motor windings may produce torque on the rotor in the opposite clockwise direction. In a third quadrant of operation, the rotor may be rotating in a counter-clockwise direction and the current in the motor windings may produce torque on the rotor in the same counter-clockwise direction. In the fourth quadrant of operation, the rotor may be rotating in a clockwise direction and the current in the motor windings may produce torque on the rotor in the opposite counter-clockwise direction.

When a motor is operating in the second and fourth quadrants of operation, the motor may provide power back to the power source. In this case, the motor may be said to be regenerating or in a regenerating mode of operation. It is desirable to reduce or prevent undesired conditions that may occur when the motor is regenerating. For example, it is desirable to reduce or prevent instability that may occur when the motor is regenerating. It is also desirable to reduce or prevent undesired current flow between the motor and the power source when the motor is operating in various quadrants, including when the motor is regenerating. Accordingly, it would be desirable to have a method and apparatus that take into account one or more of the issues discussed above as well as possibly other issues.

SUMMARY

Embodiments of the present disclosure provide an apparatus comprising a motor, a switch bridge, a motor controller, an undesired condition identifier, and an undesired condition reducer. The motor comprises windings. The switch bridge comprises a plurality of switches configured to couple a power source to the windings. The motor controller is configured to control the plurality of switches. The undesired condition identifier is configured to identify an undesired condition in the apparatus when the motor is providing power to the power source, wherein the undesired condition is defined with respect to a characteristic of the power source. The undesired condition reducer is configured to reduce the undesired condition in response to identifying the undesired condition in the apparatus by the undesired condition identifier.

Embodiments of the present disclosure also provide a method of controlling a motor. A plurality of switches in a switch bridge is controlled to couple a power source to windings of the motor. It is determined whether a voltage across the windings is greater than a first voltage threshold, wherein the first voltage threshold is defined with respect to an output voltage of the power source. A current in the windings is directed to ground via a resistor in response to a determination that the voltage across the windings is greater than the first voltage threshold.

Embodiments of the present disclosure also provide another method of controlling a motor. A plurality of switches in a switch bridge is controlled to couple a power source to windings of the motor. A duty cycle during which a number of the plurality of switches are closed to provide a current between the power source and the windings is limited such that the current between the power source and the windings does not exceed a current limit for the power source.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

Figure 1:
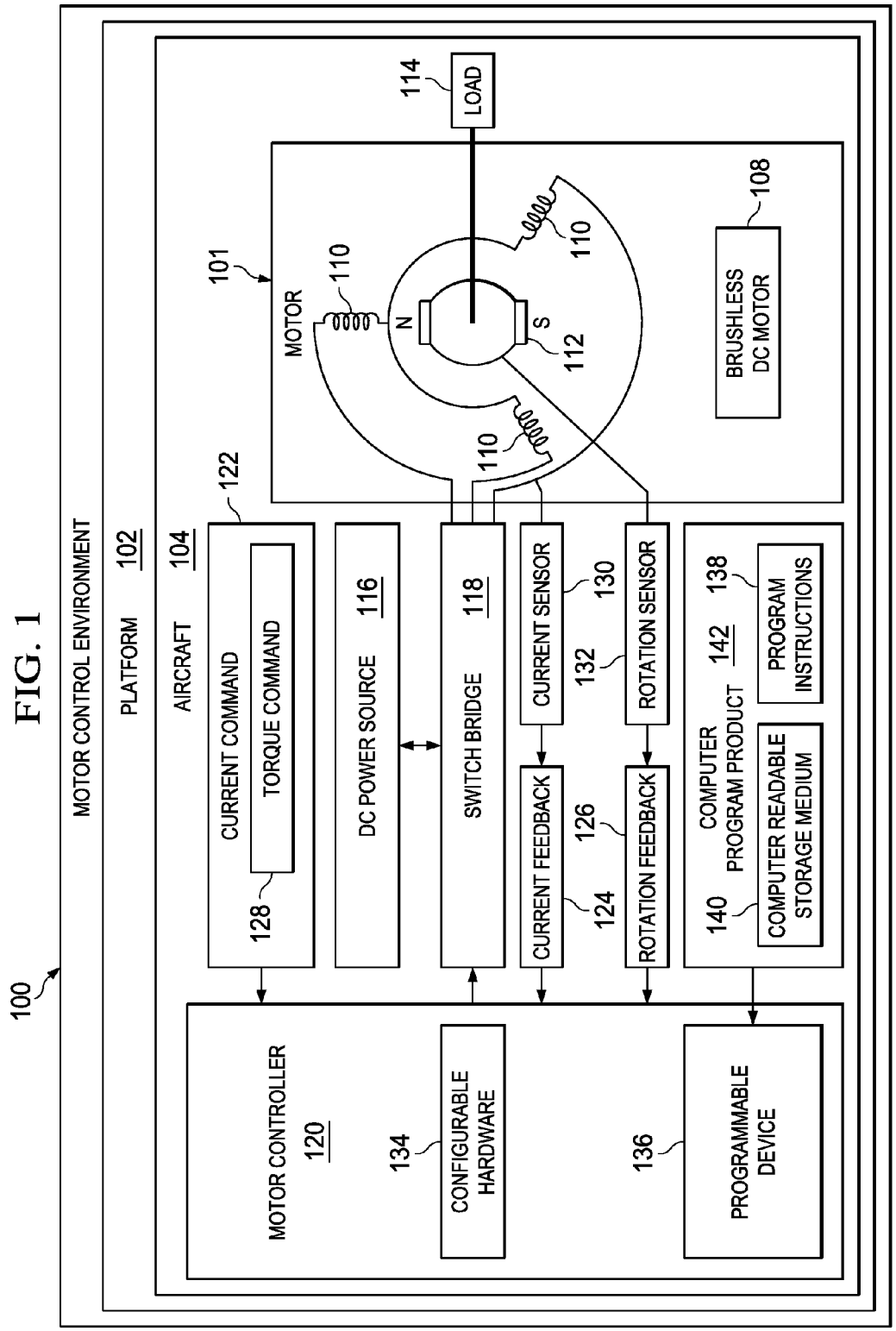
FIG. 1 is an illustration of a block diagram of a motor control environment in accordance with an illustrative embodiment.

The different illustrative embodiments recognize and take into account a number of different considerations. "A number", as used herein with reference to items, means one or more items. For example, "a number of different considerations" means one or more different considerations.

The different illustrative embodiments recognize and take into account that it is desirable to protect against instability when a motor is regenerating. When a motor is regenerating, the switches in a switch bridge are controlled such that power is provided from the motor back to a power source via the switch bridge. The switches in the switch bridge comprise switching devices configured to conduct current in a first direction when the switching devices are closed and diodes connected in parallel with the switching devices and configured to conduct current in a second direction opposite to the first direction.

When the motor is regenerating, it is possible for the voltage across the motor windings to climb higher than the voltage of the power source. When the voltage across the motor windings is higher than the power source voltage, the diodes in parallel with the switching devices in the switch bridge will conduct current in an uncontrollable manner. When the current in the switch bridge is uncontrollable, the current flowing to the power source and in the windings of the motor may run away and become unacceptably high. Such high current increases the risk of an inconsistency, or damage, occurring in one or more of the motor, the switch bridge, or the power source.

The different illustrative embodiments provide a system and method for reducing instability when a motor is regenerating. In accordance with an illustrative embodiment, impending instability is identified when a voltage across the windings of the motor is greater than a voltage threshold. The voltage threshold is defined with respect to the output voltage of a power source for the motor. For example, the voltage threshold may be approximately equal to the output voltage of the power source. In response to identifying the impending instability, current in the motor windings is directed to ground via a resistor to drive down the voltage across the motor windings. The resistor may be a variable resistor. The resistance of the variable resistor may be selected based on the level of current to be directed to ground. The variable resistor may be controlled based on the temperature of the resistor, to prevent overheating of the resistor.

The different illustrative embodiments also recognize and take into account that the flow of current between a power source and the windings of a motor via a switch bridge may have undesired effects on the power source in some cases. For example, when a motor is regenerating, power is provided from the motor back to the power source for the motor via the switch bridge. In this case, there is a potential for inconsistencies to occur in the power source if too much current is flowing back into the power source from the motor.

The duty cycle for the switching of the switching devices in a switch bridge defines the portion of a switching cycle during which current may flow between a power source and a motor. In accordance with an illustrative embodiment, the duty cycle may be controlled to limit the flow of current between the motor and the power source such that the flow of current between the motor and the power source does not exceed a current limit of the power source. The current limit of the power source may be fixed or variable. For example, the power source may be a battery. In this case, the current limit may be set based on feedback from a cell balancer circuit for the battery.

Turning to FIG. 1, an illustration of a block diagram of a motor control environment is depicted in accordance with an illustrative embodiment. Motor control environment 100 may be implemented for controlling motor 101 for operation on platform 102. Platform 102 may be any fixed or mobile structure on which motor 101 may be operated.

Motor control environment 100 may be configured to operate motor 101 to perform any appropriate function or combination of functions on platform 102. For example, without limitation, platform 102 may be aircraft 104 or another vehicle. Aircraft 104 may be a fixed wing, rotary wing, or lighter-than-air aircraft.

In some illustrative examples, aircraft 104 also may be manned or unmanned. For example, without limitation, aircraft 104 may be a commercial passenger aircraft, a cargo aircraft, a military aircraft, a government aircraft, a private aircraft, or any other type of aircraft configured to perform any appropriate task or mission or combination of tasks or missions. As further examples, platform 102 may be a submarine, an automobile, a satellite, or any other vehicle capable of traveling in the air, in space, on land, on the surface of water, underwater, or in any other medium or combination of media.

Motor 101 is an electric motor. Specifically, motor 101 may comprise brushless DC motor 108. For example, without limitation, motor 101 may comprise a brushless interior permanent magnet motor, a permanent-magnet synchronous motor, or any other appropriate type of brushless DC motor 108 or other appropriate electric motor.

Motor 101 comprises windings 110 and rotor 112. Windings 110 are stationary and form the motor stator. Windings 110 also may be referred to as coils. Power may be provided on windings 110 to drive rotation of rotor 112. Thus, windings 110 form the armature for motor 101.

Rotor 112 may be coupled to load 114. Load 114 may be any structure that may be moved in any manner via any appropriate direct or indirect connection to rotor 112. For example, on aircraft 104, load 114 may include actuators for flight control surfaces, for landing gear, or for performing any other appropriate functions or combinations of functions on aircraft 104. In other applications, load 114 may be a pump, a vehicle drive train, an actuator for performing another function, or any other appropriate load or combination of loads on platform 102.

Electrical power for motor 101 may be provided by DC power source 116. DC power source 116 may comprise any appropriate source of DC power. For example, without limitation, DC power source 116 on aircraft 104 may comprise a DC bus that is provided with DC power from an AC to DC power converter. Power for the AC to DC power converter may be provided from AC power on an AC bus. AC power on the AC bus may be provided by a generator on aircraft 104. For example, without limitation, the generator may be driven by a number of engines on aircraft 104. In other applications, DC power source 116 may be another type of DC power source, such as a battery or any other appropriate source or combination of sources of DC power.

DC power source 116 is coupled to windings 110 of motor 101 via switch bridge 118. Switch bridge 118 comprises a plurality of switches that are configured to be opened and closed to connect DC power source 116 to windings 110 in a variety of configurations. The plurality of switches in switch bridge 118 may be controlled to provide the appropriate configuration of power on windings 110 to operate motor 101 in a desired manner. The number and arrangement of switches in switch bridge 118 may depend on the number of phases of windings 110 in motor 101. For example, without limitation, switch bridge 118 may be a three-phase bridge comprising three parallel half H-bridges for coupling DC power source 116 to three-phase windings in a three-phase motor.

Motor controller 120 may be configured to control the switching of switch bridge 118 to control the operation of motor 101 in a desired manner. In the present application, including in the claims, the switching of a switch bridge refers to the opening and closing of one or more switches in a switch bridge. For example, without limitation, motor controller 120 may employ current command 122, current feedback 124, and rotation feedback 126 to control motor 101.

Current command 122 may indicate desired current in windings 110 of motor 101. For example, without limitation, current command 122 may indicate a desired magnitude and direction of current in windings 110. The torque produced by motor 101 is a function of the current in windings 110 of motor 101. Therefore, current command 122 may be referred to as torque command 128.

Motor controller 120 may receive current command 122 to start motor 101, to stop motor 101, or to operate motor 101 or load 114 at a desired speed in a desired direction. Current command 122 may be provided to motor controller 120 in any appropriate form from any appropriate source. For example, without limitation, current command 122 may be received by motor controller 120 from one or more higher level controllers for controlling motor 101 or load 114. Such a higher level controller may comprise an entirely automated controller, a human operator, or a human operator in combination with a machine controller.

Current feedback 124 may identify the current in windings 110 of motor 101. The current in windings 110 of motor 101 that is identified by current feedback 124 may be referred to as the actual current in windings 110. Preferably, current feedback 124 includes information identifying both the magnitude and direction of current in windings 110.

Current feedback 124 may be provided by any appropriate current sensor 130. Current sensor 130 may include any number of appropriate sensors that may be configured to provide the desired current feedback 124. For example, without limitation, motor controller 120 may be configured to control the switching of switch bridge 118 in an appropriate manner to cause the current in windings 110 of motor 101, as identified by current feedback 124, to match the desired current identified in current command 122.

Rotation feedback 126 may identify the rotation of rotor 112 of motor 101. Preferably, rotation feedback 126 includes information identifying both the direction and speed of rotation of rotor 112. Rotation feedback 126 may be provided by any appropriate rotation sensor 132. Rotation sensor 132 may include any number of appropriate sensors that may be configured to provide the desired rotation feedback 126.

Motor controller 120 may be implemented using hardware or hardware in combination with software. For example, motor controller 120 may be implemented using configurable hardware 134, programmable device 136, or both. Configurable hardware 134 may comprise hardware that is configurable to perform one or more functions of motor controller 120. Programmable device 136 may comprise any device that is programmable to implement one or more functions of motor controller 120. For example, without limitation, programmable device 136 may comprise a programmable microcontroller, digital signal processor, or other programmable device.

Programmable device 136 may be configured to run software or firmware in the form of program instructions 138 to implement one or more functions of motor controller 120. Program instructions 138 may be stored in any appropriate computer readable storage medium 140 for use by, or transfer to, programmable device 136. For example, without limitation, computer readable storage medium 140 may comprise a computer readable storage device or any other physical medium for storing program instructions 138. Program instructions 138 stored on computer readable storage medium 140 may comprise computer program product 142.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, motor 101 may be connected to drive more than one load. The illustrative embodiments may be used to control motors of any size for use in any application or operating environment. For example, without limitation, the illustrative embodiments may be used to control motors used on automobiles, airplanes, boats, spacecraft, and other vehicles. For example, without limitation, the illustrative embodiments may be used to control motors for pointing antennas on spacecraft, for heating ventilation and air conditioning (HVAC) systems, for boring devices for riveting on aircraft wings and fuselages, and for other applications.

Figure 2:
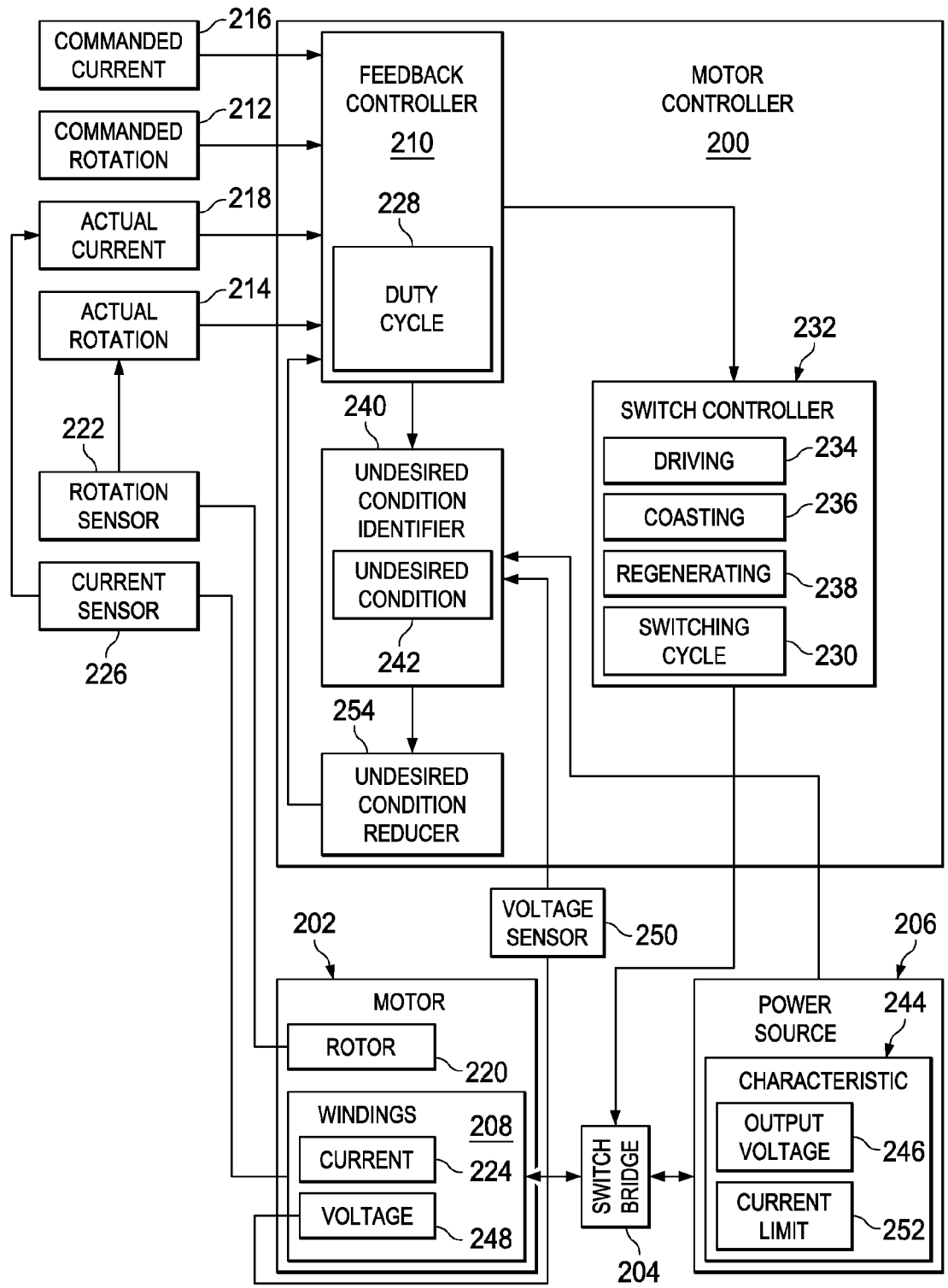
FIG. 2 is an illustration of a block diagram of a motor controller in accordance with an illustrative embodiment.

Turning to FIG. 2, an illustration of a block diagram of a motor controller is depicted in accordance with an illustrative embodiment. In this example, motor controller 200 may be an example of one implementation of motor controller 120 for controlling motor 101 in FIG. 1.

Figure 3:
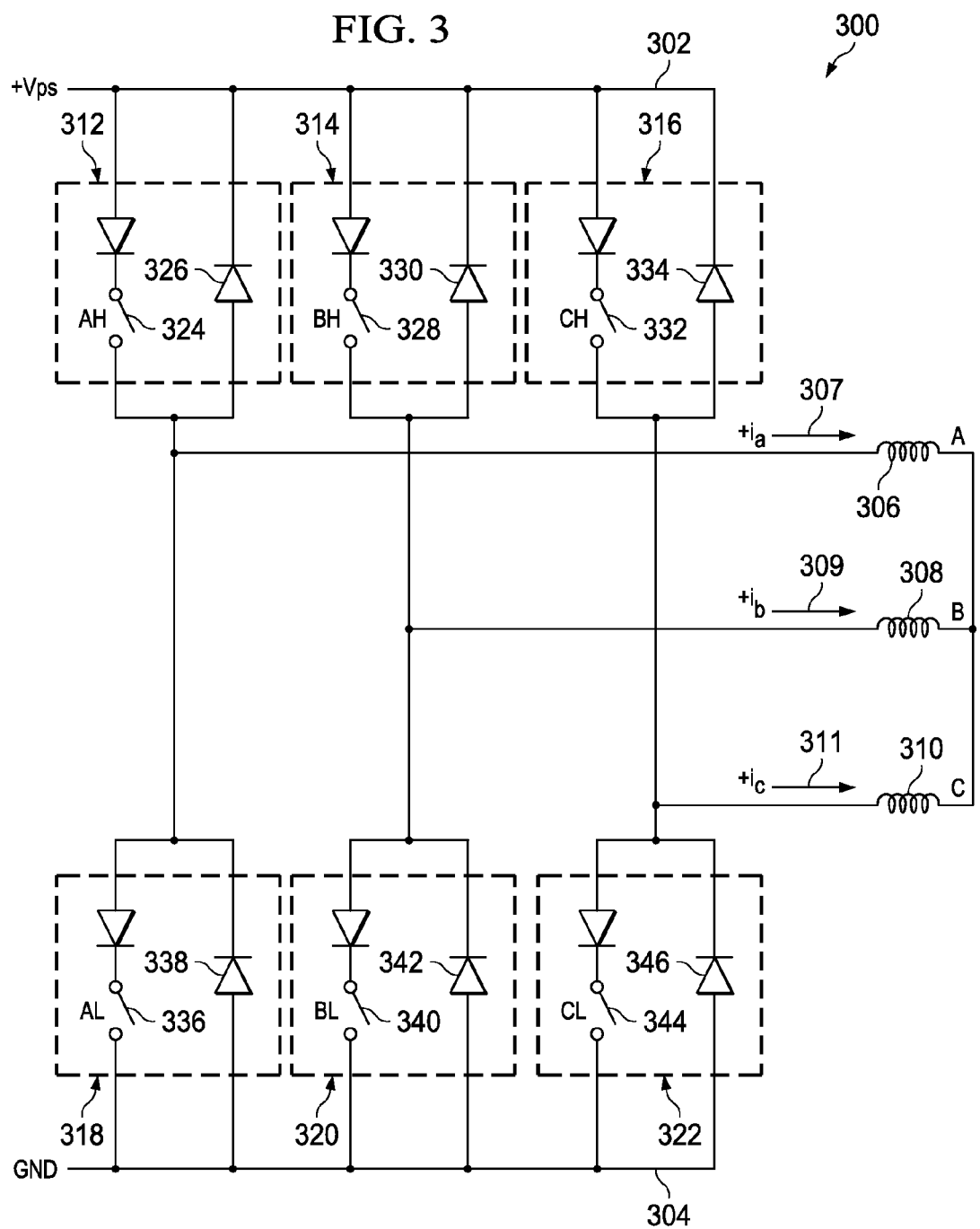
FIG. 3 is an illustration of a schematic circuit diagram of a switch bridge for controlling current in a motor in accordance with an illustrative embodiment.
Figure 14:
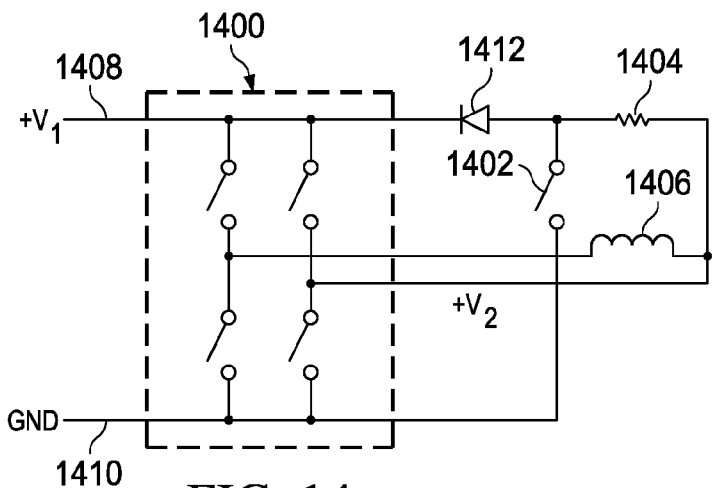
FIG. 14 is an illustration of a schematic circuit diagram of a switch bridge and a switch and resistor for directing current in a motor winding to ground in accordance with an illustrative embodiment.

Motor controller 200 may be configured to control the operation of motor 202 in a desired manner by controlling the switching of the switches in switch bridge 204. Switch bridge 204 comprises a plurality of switches that are configured to be opened and closed to connect power source 206 to windings 208 of motor 202 in a variety of configurations. The switches in switch bridge 204 may be controlled to provide the appropriate configuration of power on windings 208 to operate motor 202 in a desired manner. The number and arrangement of switches in switch bridge 204 may depend on the number of phases of windings 208 in motor 202. For example, without limitation, switch bridge 204 may be a three-phase bridge comprising three parallel half H-bridges for coupling power source 206 to three-phase windings in a three-phase motor. Switch bridge 300 in FIG. 3 is an example of such a three-phase switch bridge. Switch bridge 1400 in FIG. 14 is an example of a switch bridge for a single phase winding of a motor.

Motor controller 200 may comprise feedback controller 210. Feedback controller 210 may be configured to receive commanded rotation 212, actual rotation 214, commanded current 216, and actual current 218. Commanded rotation 212 may indicate a desired rotation for rotor 220 of motor 202. For example, commanded rotation 212 may indicate a desired direction and speed of rotation of rotor 220. Actual rotation 214 comprises an indication of the rotation of rotor 220. Actual rotation 214 is provided as feedback to feedback controller 210. Actual rotation 214 may be identified using any appropriate rotation sensor 222 for identifying the rotation of rotor 220.

Commanded current 216 may indicate a desired current in windings 208 of motor 202. For example, commanded current 216 may indicate a desired magnitude and direction of current 224 in windings 208 of motor 202. Actual current 218 comprises an indication of current 224 in windings 208 of motor 202. Actual current 218 is provided as feedback to feedback controller 210. Actual current 218 may be identified using any appropriate current sensor 226.

Feedback controller 210 may be implemented in any appropriate manner to generate duty cycle 228. Duty cycle 228 is the portion of each switching cycle 230 during which the appropriate switches in switch bridge 204 are closed so that current can flow between power source 206 and windings 208 of motor 202. Duty cycle 228 provided by feedback controller 210 also may identify a direction of current flow between power source 206 and windings 208 during the identified portion of switching cycle 230.

For example, without limitation, duty cycle 228 may be identified by a single value output from feedback controller 210 that indicates both whether commanded current 216 is greater than or less than actual current 218 in windings 208 of motor 202, as well as the magnitude of the difference between commanded current 216 and actual current 218 in windings 208 of motor 202. For example, the sign of duty cycle 228 may indicate whether commanded current 216 is greater than or less than actual current 218 in windings 208. The absolute value of duty cycle 228 may indicate the magnitude of the difference between commanded current 216 and actual current 218. In this case, the value for duty cycle 228 may be zero when actual current 218 in windings 208 of motor 202 matches commanded current 216.

For example, without limitation, feedback controller 210 may comprise a proportional-integral controller or any other appropriate controller for determining commanded current 216 relative to the difference between commanded rotation 212 and actual rotation 214. Feedback controller 210 may comprise a proportional-integral controller or any other appropriate controller for determining duty cycle 228 relative to the difference between commanded current 216 and actual current 218. Duty cycle 228 generated by feedback controller 210 is provided to switch controller 232.

Switch controller 232 is configured to generate the appropriate control signals for opening and closing the switches in switch bridge 204 to implement duty cycle 228. Switch controller 232 may be configured to control the switching of the switches in switch bridge 204 based on switching cycle 230. The duration of switching cycle 230 may be selected in any appropriate manner. Switch controller 232 may implement duty cycle 228 by controlling the switches in switch bridge 204 each switching cycle 230 to control the portion of each switching cycle 230 in which switch bridge 204 is configured for driving 234, coasting 236, or regenerating 238.

When the switches in switch bridge 204 are configured for driving 234, power source 206 is connected across windings 208 of motor 202 to increase the magnitude of current 224 in windings 208. Driving 234 also may be referred to as generating current 224 in windings 208 of motor 202.

The switches in switch bridge 204 may be configured to short-circuit windings 208 of motor 202 through switch bridge 204 to configure switch bridge 204 for coasting 236. During coasting 236, current 224 in windings 208 may remain relatively constant. For example, during coasting 236, current 224 in windings 208 of motor 202 may decrease only due to resistance and similar losses in switch bridge 204 and windings 208.

When the switches in switch bridge 204 are configured for regenerating 238, power source 206 is connected across windings 208 of motor 202 to return the energy in windings 208 to power source 206. During regenerating 238, the magnitude of current 224 in windings 208 of motor 202 is reduced relatively quickly.

Switch controller 232 may configure switch bridge 204 for driving 234, coasting 236, and regenerating 238 based on duty cycle 228 from feedback controller 210. For example, duty cycle 228 from feedback controller 210 may indicate that the desired current in windings 208 of motor 202 is greater than actual current 218 in windings 208. In this case, switch controller 232 may control the switches in switch bridge 204 to configure switch bridge 204 for driving 234 for at least a portion of switching cycle 230 to increase current 224 in windings 208.

The switches in switch bridge 204 that are controlled to configure switch bridge 204 for driving 234, coasting 236, or regenerating 238 may be different depending on the direction of current 224 in windings 208 of motor 202. In other words, the switches in switch bridge 204 that are controlled to configure switch bridge 204 for driving 234, coasting 236, or regenerating 238 may be different depending on the quadrant of operation of motor 202.

Undesired condition identifier 240 is configured to identify the occurrence of undesired condition 242 during operation of motor 202 by motor controller 200. Undesired condition 242 may include any condition that may have an undesirable effect on one or more of motor controller 200, motor 202, switch bridge 204, and power source 206. For example, undesired condition 242 may be defined with respect to characteristic 244 of power source 206.

One characteristic 244 of power source 206 is output voltage 246. When motor 202 is regenerating 238, voltage 248 across windings 208 may become greater than output voltage 246 of power source 206. Voltage 248 across windings 208 that is greater than output voltage 246 of power source 206 may result in undesirable large and unstable current in windings 208. The instability resulting from voltage 248 in windings 208 being greater than output voltage 246 of power source 206 is one example of undesired condition 242. In this case, undesired condition 242 may be identified by undesired condition identifier 240 by comparing output voltage 246 of power source 206 to voltage 248 across windings 208. Voltage 248 across windings 208 may be determined using an appropriate voltage sensor 250.

Current limit 252 of power source 206 is another characteristic 244 of power source 206. Inconsistencies in power source 206 may result if the current provided to power source 206 is greater than current limit 252. Thus, current 224 in windings 208 that is greater than current limit 252 of power source 206 when motor 202 is regenerating 238 is another example of undesired condition 242.

Undesired condition reducer 254 may be configured to take appropriate action to reduce or prevent undesired condition 242. For example, undesired condition reducer 254 may be configured to direct current 224 in windings 208 to ground to reduce voltage 248 across windings 208 in response to a determination that voltage 248 across windings 208 is greater than output voltage 246 of power source 206. As another example, undesired condition reducer 254 may be configured to control duty cycle 228 to reduce current 224 on windings 208 provided to power source 206 in response to a determination that current 224 provided to power source 206 is greater than current limit 252 of power source 206.

The illustration of FIG. 2 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Turning now to FIG. 3, an illustration of a schematic circuit diagram of a switch bridge for controlling current in a motor is depicted in accordance with an illustrative embodiment. In this example, switch bridge 300 is an example of one implementation of switch bridge 118 in FIG. 1 and switch bridge 204 in FIG. 2.

Switch bridge 300 is connected to DC power on line 302 and ground 304. Switch bridge 300 is configured to couple DC power on line 302 to windings 306, windings 308, and windings 310 of a motor.

In this example, the motor connected to switch bridge 300 is a three-phase motor comprising windings 306 for phase A, windings 308 for phase B, and windings 310 for phase C. For purposes of the present explanation, current in windings 306, windings 308, and windings 310 in the direction indicated by arrow 307, arrow 309, and arrow 311, respectively, may be referred to as positive current or current in a positive direction. Current in windings 306, windings 308, and windings 310 in the direction opposite to arrow 307, arrow 309, and arrow 311 may be referred to as negative current or current in a negative direction.

Switch bridge 300 comprises switching units 312, 314, 316, 318, 320, and 322 arranged to form three parallel half H-bridges. Switching units 312, 314, 316, 318, 320, and 322 may be implemented using solid state circuit elements. For example, without limitation, switching units 312, 314, 316, 318, 320, and 322 may be implemented using metal-oxide-semiconductor field-effect transistors (MOSFETs), insulated-gate bipolar transistors (IGBTs), or other transistors or combinations of transistors. Switching units 312, 314, 316, 318, 320, and 322 may comprise switching devices configured to conduct in a first direction when the switching devices are closed and diodes are connected in parallel with the switching devices and configured to conduct in a second direction opposite to the first direction.

Switching unit 312 is connected between line 302 and windings 306 for phase A. Switching unit 312 comprises switch AH 324 and diode 326. Switch AH 324 conducts current in the direction from line 302 to windings 306 when closed. Diode 326 is parallel with switch AH 324 and conducts current in the opposite direction of switch AH 324.

Switching unit 314 is connected between line 302 and windings 308 for phase B. Switching unit 314 comprises switch BH 328 and diode 330. Switch BH 328 conducts current in the direction from line 302 to windings 308 when closed. Diode 330 is parallel with switch BH 328 and conducts current in the opposite direction of switch BH 328.

Switching unit 316 is connected between line 302 and windings 310 for phase C. Switching unit 316 comprises switch CH 332 and diode 334. Switch CH 332 conducts current in the direction from line 302 to windings 310 when closed. Diode 334 is parallel with switch CH 332 and conducts current in the opposite direction of switch CH 332.

Switching unit 318 is connected between windings 306 for phase A and ground 304. Switching unit 318 comprises switch AL 336 and diode 338. Switch AL 336 conducts current in the direction from windings 306 to ground 304 when closed. Diode 338 is parallel with switch AL 336 and conducts current in the opposite direction of switch AL 336.

Switching unit 320 is connected between windings 308 for phase B and ground 304. Switching unit 320 comprises switch BL 340 and diode 342. Switch BL 340 conducts current in the direction from windings 308 to ground 304 when closed. Diode 342 is parallel with switch BL 340 and conducts current in the opposite direction of switch BL 340.

Switching unit 322 is connected between windings 310 for phase C and ground 304. Switching unit 322 comprises switch CL 344 and diode 346. Switch CL 344 conducts current in the direction from windings 310 to ground 304 when closed. Diode 346 is parallel with switch CL 344 and conducts current in the opposite direction of switch CL 344.

In accordance with an illustrative embodiment, the switches in switch bridge 300 may be controlled using impulse width modulation to control the current in windings 306, windings 308, and windings 310. For an existing current in either a positive or negative direction in one of windings 306, windings 308, or windings 310, switch bridge 300 may be configured for driving the existing current from the DC power on line 302, for coasting the existing current in switch bridge 300, or for regenerating the existing current back to line 302. Switch bridge 300 also may be controlled to reverse the current in windings 306, windings 308, and windings 310 to change the quadrant of operation of the motor.

Switch bridge 300 is an example of a generic switch bridge structure that is presented to more clearly describe the operation of various illustrative embodiments. The illustration of FIG. 3 is not meant to imply physical or architectural limitations to the manner in which a switch bridge in accordance with different illustrative embodiments may be implemented. A switch bridge, in accordance with different illustrative embodiments, may be implemented with combinations of parts that are different from those illustrated for example in FIG. 3.

For example, for a switch bridge implemented using IGBTs, the diodes in the switching units of the switch bridge may need to be provided as separate devices, because IGBTs do not have body diodes. For a switch bridge implemented using MOSFETs, the internal body diodes of the MOSFETs may be used. With MOSFETs used for switches, separate freewheeling diodes are not necessary. Separate diodes in series with the MOSFET switches also are not necessary, but may be used in some applications.

Turning to FIGS. 4-7, various configurations of switch bridge 300 in FIG. 3 for driving, coasting, and regenerating the current in the windings of a motor are depicted in accordance with an illustrative embodiment. The example configurations in FIGS. 4-7 are for driving, coasting, and regenerating the current in one set of windings of a motor operating in a first quadrant of operation. Switching configurations of a switch bridge for driving, coasting, and regenerating the current in other windings of the motor and for other quadrants of operation will be known to those skilled in the art based on the detailed description and examples of illustrative embodiments as presented herein.

Figure 4:
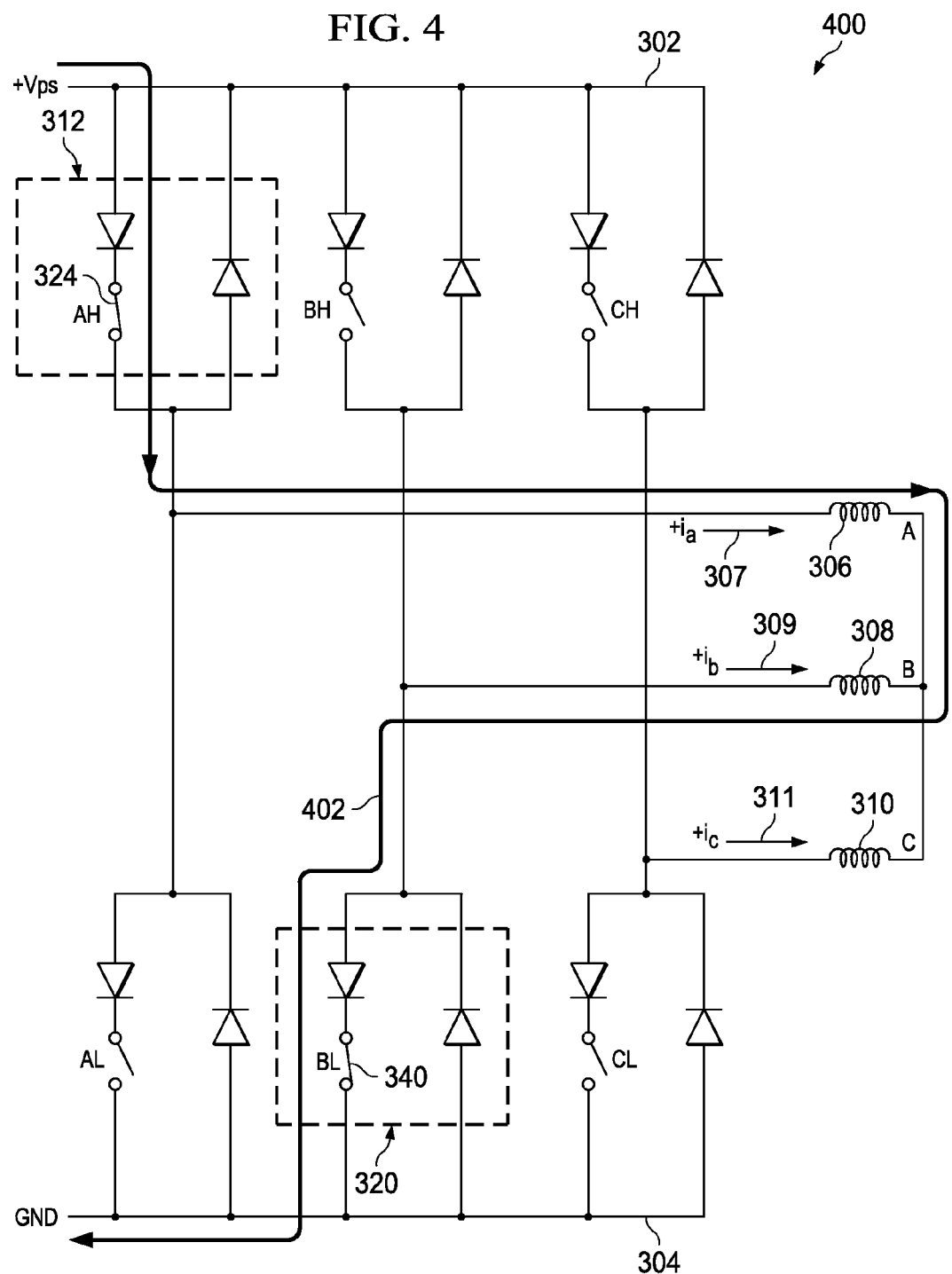
FIG. 4 is an illustration of a schematic circuit diagram of a switch bridge for controlling current in a motor in a driving configuration in accordance with an illustrative embodiment.

Turning to FIG. 4, an illustration of a schematic circuit diagram of a switch bridge for controlling current in a motor in a driving configuration is depicted in accordance with an illustrative embodiment. In this example, switch bridge 400 is an example configuration of switch bridge 300 in FIG. 3.

In this example, the driving configuration for switch bridge 400 comprises closing switch AH 324 and switch BL 340. Closing switches AH 324 and BL 340 results in current 402 running from line 302 through closed switch AH 324, in the positive direction of arrow 307 through windings 306 for phase A, and through closed switch BL 340 to ground 304. Assuming an existing positive current in windings 306 in the direction of arrow 307, current 402 will drive the existing current in windings 306, thereby increasing the current in windings 306. For example, without limitation, the driving configuration for switch bridge 400 may be used in response to an indication from a motor controller that the current in the positive direction of arrow 307 in windings 306 should be increased.

Figure 5:
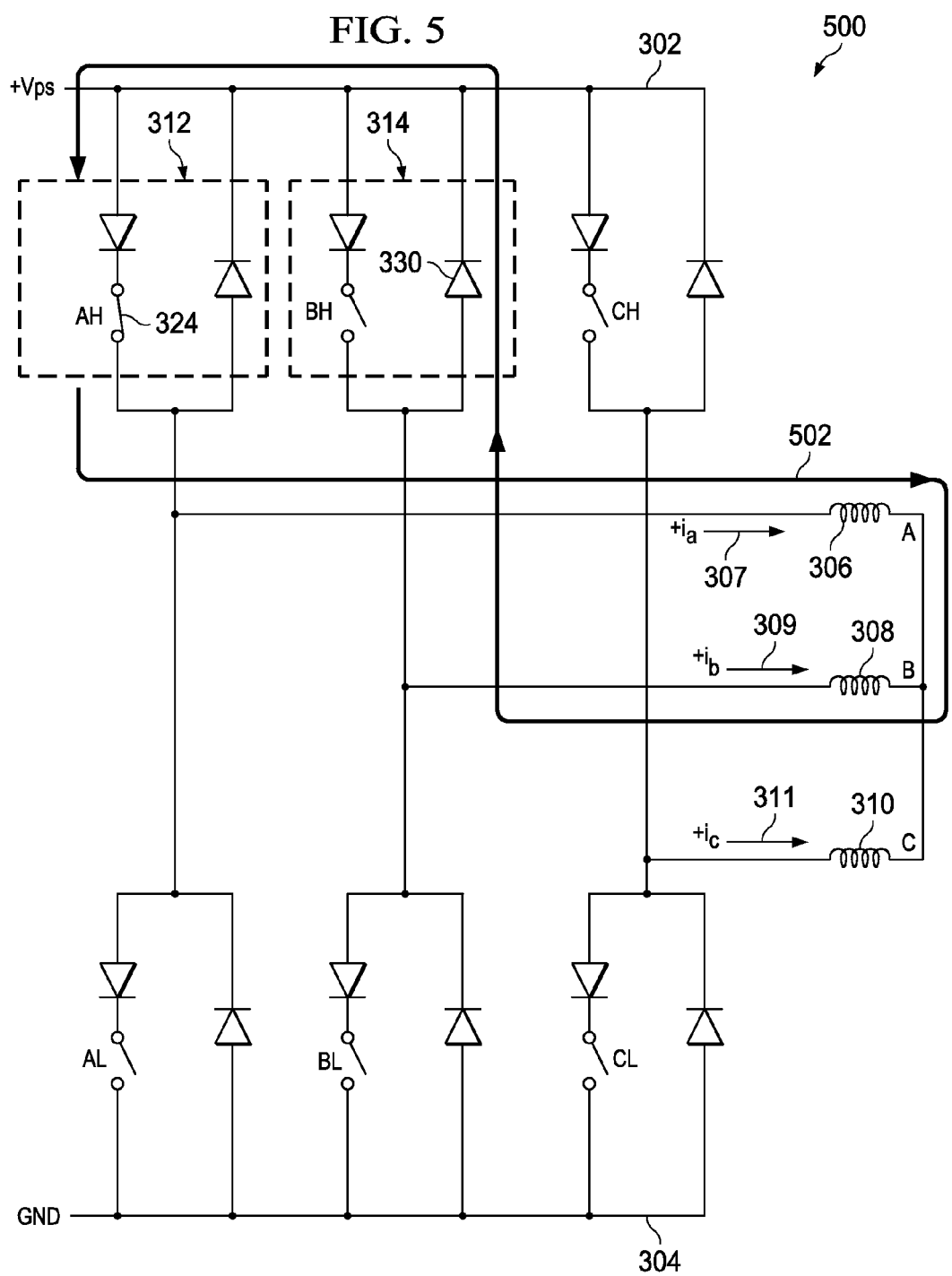
FIG. 5 is an illustration of a schematic circuit diagram of a switch bridge for controlling current in a motor in a first coasting configuration in accordance with an illustrative embodiment.

Turning now to FIG. 5, an illustration of a schematic circuit diagram of a switch bridge for controlling current in a motor in a first coasting configuration is depicted in accordance with an illustrative embodiment. In this example, switch bridge 500 is another example configuration of switch bridge 300 in FIG. 3.

In this example, switch AH 324 is closed to provide the coasting configuration for switch bridge 500. Assuming an existing positive current in windings 306 in the direction of arrow 307, closing switch AH 324 creates a short circuit through switch bridge 500 for the existing current in windings 306. The resulting current 502 in switch bridge 500 runs from windings 306 through diode 330 in switching unit 314, through closed switch AH 324, and back to windings 306 in the positive direction of arrow 307. The existing current in windings 306 may remain relatively constant with switch bridge 500 in coasting configuration.

With switch bridge 500 in coasting configuration the existing current in windings 306 may decrease by a relatively small amount due to resistance and similar losses in switch bridge 500 and windings 306 and windings 308. For example, without limitation, the coasting configuration for switch bridge 500 may be used in response to an indication from a motor controller that the current in the positive direction of arrow 307 in windings 306 should be maintained at the present level.

Figure 6:
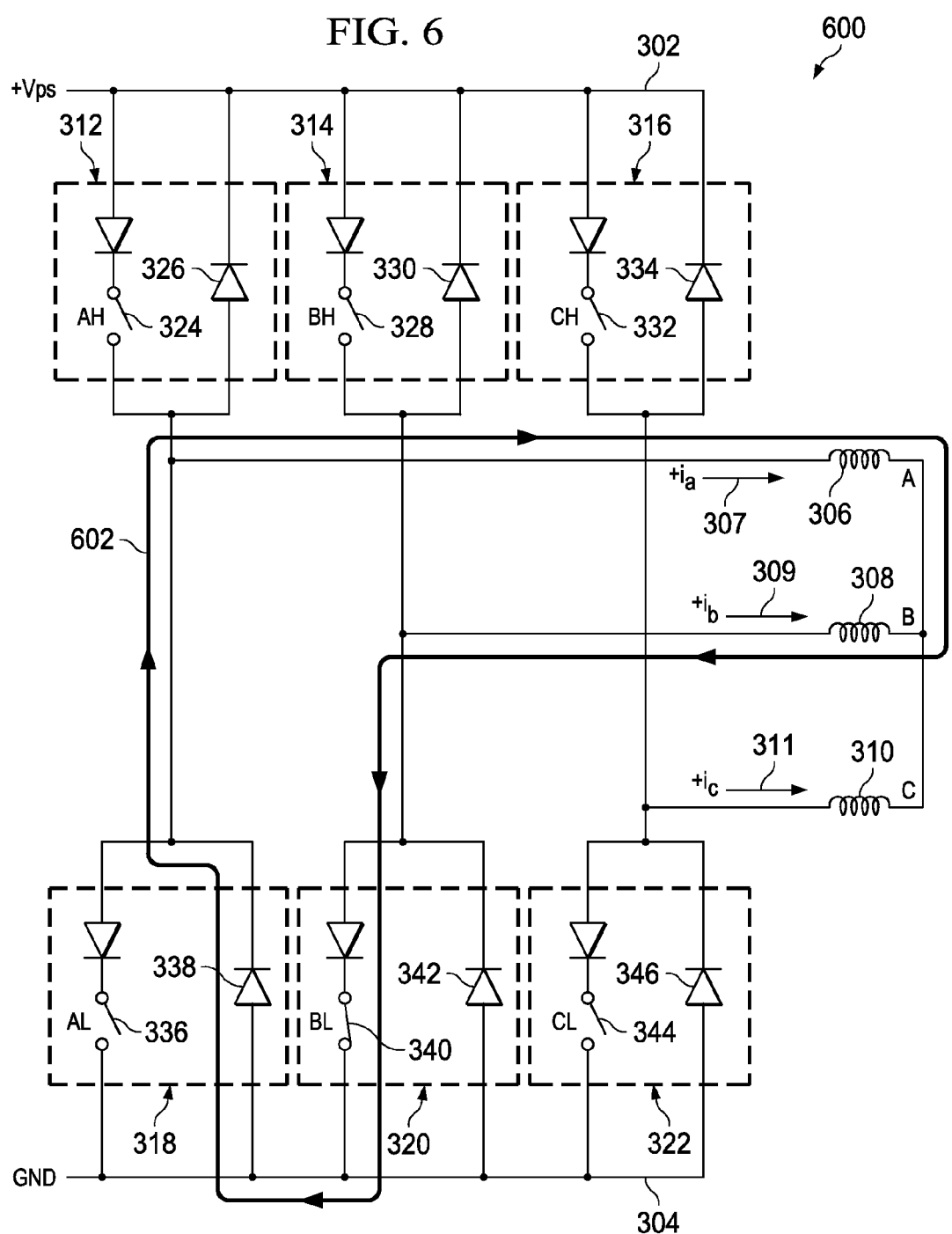
FIG. 6 is an illustration of a schematic circuit diagram of a switch bridge for controlling current in a motor in a second coasting configuration in accordance with an illustrative embodiment.

Turning to FIG. 6, an illustration of a schematic circuit diagram of a switch bridge for controlling current in a motor in a second coasting configuration is depicted in accordance with an illustrative embodiment. In this example, switch bridge 600 is another example configuration of switch bridge 300 in FIG. 3.

In this example, switch BL 340 is closed to provide the coasting configuration for switch bridge 600. Assuming an existing positive current in windings 306 in the direction of arrow 307, closing switch BL 340 creates a short circuit through switch bridge 600 for the existing current in windings 306. The resulting current 602 in switch bridge 600 runs from windings 306 through closed switch BL 340, through diode 338 in switching unit 318, and back to windings 306 in the positive direction of arrow 307. The existing current in windings 306 may remain relatively constant with switch bridge 600 in coasting configuration.

With switch bridge 600 in coasting configuration the existing current in windings 306 may decrease by a relatively small amount due to resistance and similar losses in switch bridge 600 and windings 306 and windings 308. For example, without limitation, the coasting configuration for switch bridge 600 may be used in response to an indication from a motor controller that the current in the positive direction of arrow 307 in windings 306 should be maintained at the present level.

The coasting configurations of switch bridge 500 in FIG. 5 and switch bridge 600 in FIG. 6 are alternative configurations for coasting a current in the positive direction of arrow 307 in windings 306. In accordance with an illustrative embodiment, both alternative configurations may be used during a switching cycle in which coasting the positive current in the direction of arrow 307 in windings 306 is called for. For example, during a switching cycle in which coasting the positive current in windings 306 is called for, switch AH 324 may be closed and switch BL 340 opened to implement coasting configuration for switch bridge 500 in FIG. 5 for a portion of the switching cycle. Switch AH 324 then may be opened and switch BL 340 closed to implement coasting configuration for switch bridge 600 in FIG. 6, during another portion of the switching cycle.

Switching between different coasting configurations in this manner shares the burden of carrying the coasting current between different components of the switch bridge each switching cycle. Therefore, switching between different coasting configurations in this manner may reduce undesired heating of components in the switch bridge resulting from carrying the coasting current.

Figure 7:
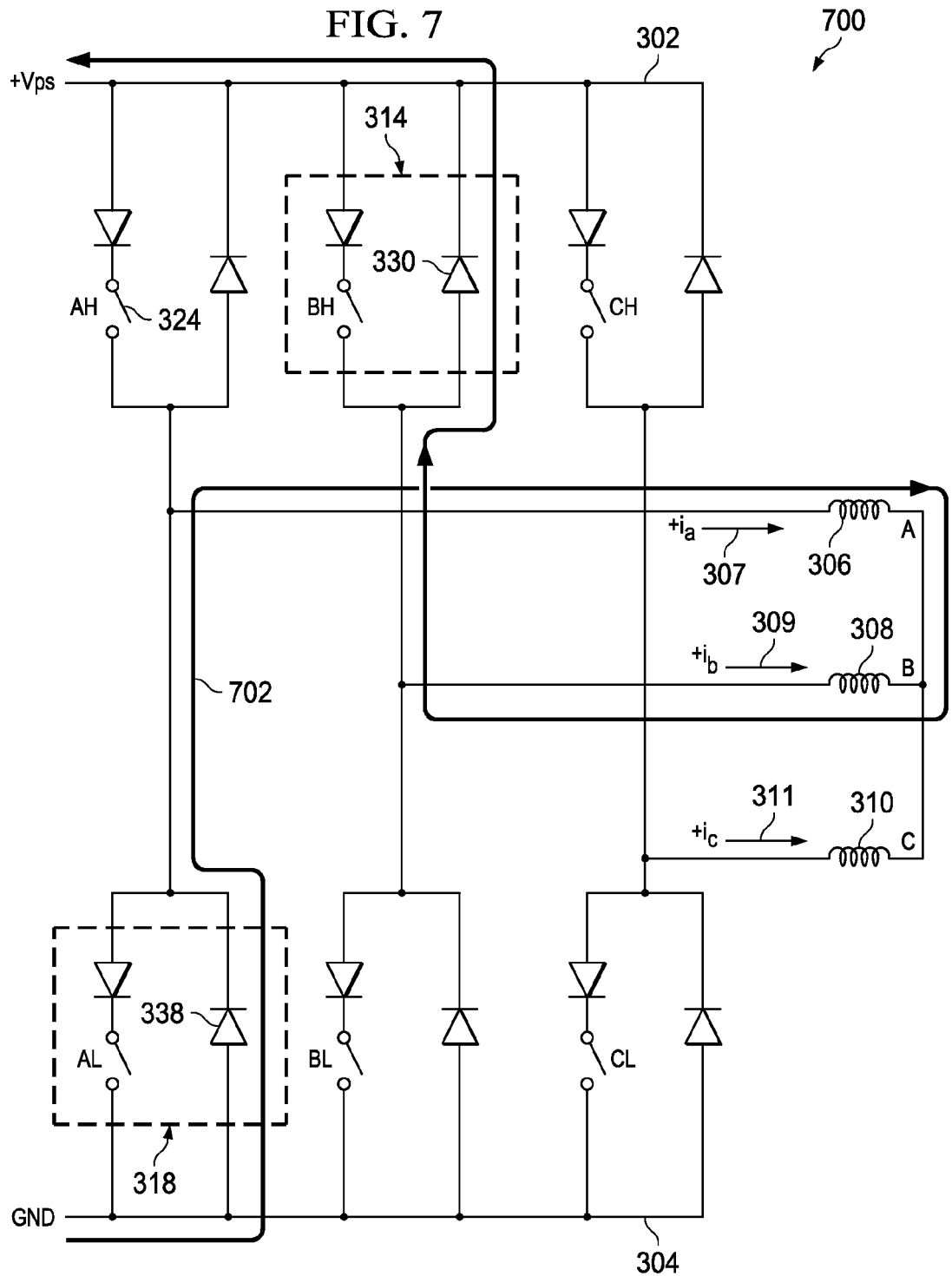
FIG. 7 is an illustration of a schematic circuit diagram of a switch bridge for controlling current in a motor in a regenerating configuration in accordance with an illustrative embodiment.

Turning to FIG. 7, an illustration of a schematic circuit diagram of a switch bridge for controlling current in a motor in a regenerating configuration is depicted in accordance with an illustrative embodiment. In this example, switch bridge 700 is another example configuration of switch bridge 300 in FIG. 3.

In this example, the regenerating configuration of switch bridge 700 comprises opening all of the switches in switch bridge 700. Assuming an existing positive current in windings 306 in the direction of arrow 307, opening all of the switches in switch bridge 700 will result in regenerating current 702.

Regenerating current 702 runs in the direction from ground 304 through diode 338, in the positive direction of arrow 307 through windings 306, and through diode 330 to line 302. Regenerating current 702 returns the energy in windings 306 back to the DC power source via line 302, thereby decreasing the current in windings 306. For example, without limitation, the regenerating configuration for switch bridge 700 may be used in response to an indication from a motor controller that the current in the positive direction of arrow 307 in windings 306 should be decreased.

Figure 8:
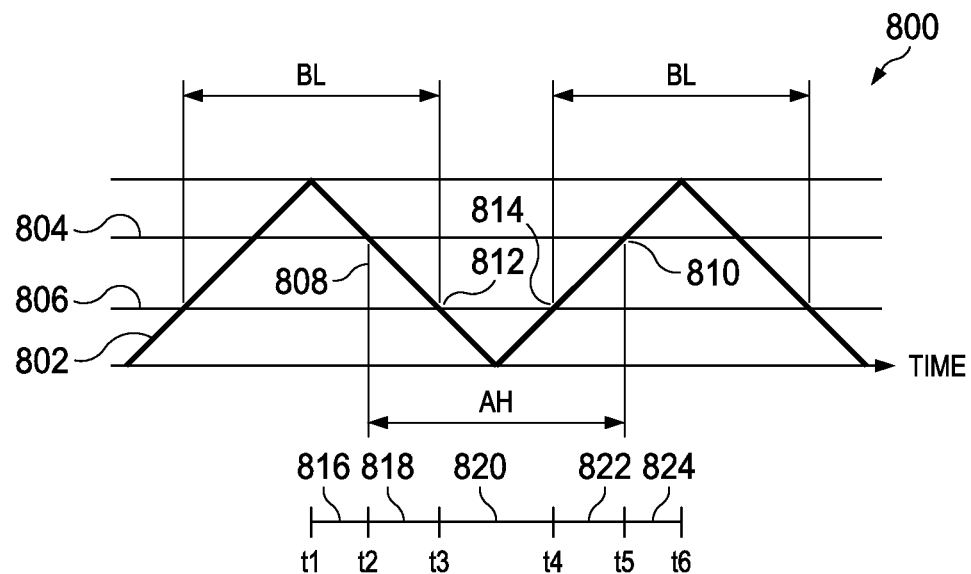
FIG. 8 is an illustration of switch timing for a switching cycle providing driving and coasting current for a motor in accordance with an illustrative embodiment.
Figure 9:
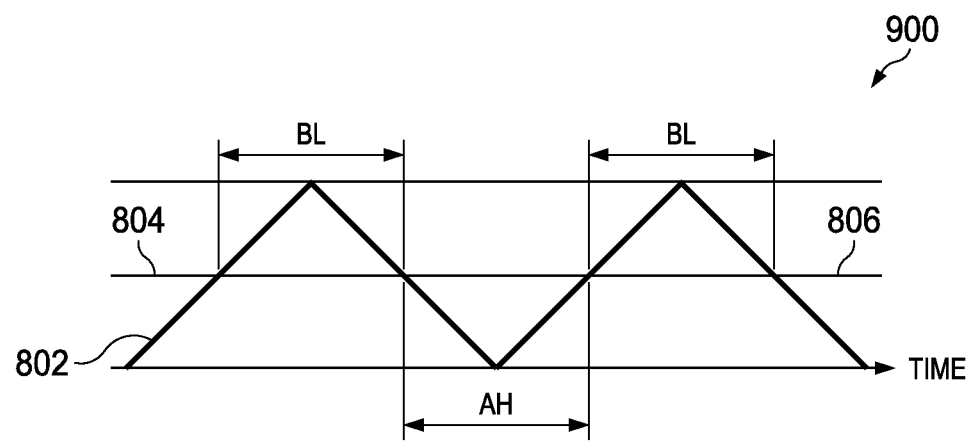
FIG. 9 is an illustration of switch timing for a switching cycle providing only coasting current for a motor in accordance with an illustrative embodiment.
Figure 10:
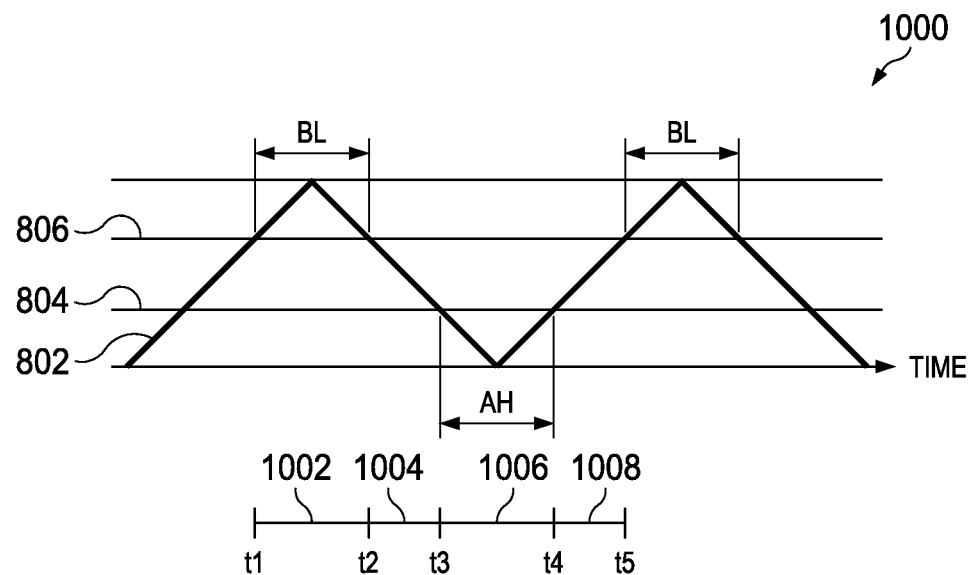
FIG. 10 is an illustration of switch timing for a switching cycle providing coasting and regenerating current for a motor in accordance with an illustrative embodiment.

Turning to FIGS. 8-10, switch timing in various switching cycles for controlling the switches in a switch bridge for driving, coasting, and regenerating the current in the windings of a motor are depicted in accordance with an illustrative embodiment. The example switching cycles in FIGS. 8-10 are for driving, coasting, and regenerating the current in one set of windings of a motor operating in a first quadrant of operation. Switching cycles for controlling the switches in a switch bridge for driving, coasting, and regenerating the current in other windings of the motor and for other quadrants of operation will be known to those skilled in the art based on the detailed description and examples of illustrative embodiments as presented herein. References to particular switches in FIGS. 8-10 are references to corresponding switches in switch bridge 300 in FIG. 3.

Turning to FIG. 8, an illustration of switch timing for a switching cycle providing driving and coasting current for a motor is depicted in accordance with an illustrative embodiment. In this example, switching cycle 800 may be an example of one implementation of switching cycle 230 implemented in switch controller 232 for controlling the switches in switch bridge 204 in FIG. 2 or in switch bridge 300 in FIG. 3.

Switching cycle 800 may be defined with reference to triangle wave 802. The frequency of triangle wave 802 may define the frequency of switching cycle 800. In accordance with an illustrative embodiment, switches in a switch bridge may be opened and closed during each switching cycle to provide the desired driving, coasting, and regenerating current for the windings of a motor, as defined by a motor controller. Therefore, the frequency of triangle wave 802 also may define the switching frequency of the switches in the switch bridge. The frequency of triangle wave 802, and, therefore, the frequency of switching cycle 800, may be selected in any appropriate manner.

In this example, the position of line 804 with respect to triangle wave 802 may define the timing of the switching of switch AH in a switch bridge during switching cycle 800. For example, switch AH may be closed at point 808, where triangle wave 802 is falling and crosses line 804. Switch AH may be opened at point 810, where triangle wave 802 is rising and crosses line 804. Similarly, the position of line

806 with respect to triangle wave 802 may define the timing of the switching of switch BL in the switch bridge during switching cycle 800. For example, switch BL may be opened at point 812, where triangle wave 802 is falling and crosses line 806. Switch BL may be closed at point 814, where triangle wave 802 is rising and crosses line 806.

As will be seen, the positions of line 804 and line 806 with respect to triangle wave 802 may define how much time during each switching cycle a switch bridge is configured for driving, coasting, or regenerating current in the windings of a motor. Therefore, the positions of line 804 and line 806 with respect to triangle wave 802 may be adjusted by a motor controller as appropriate to achieve the desired current in the motor windings. For example, without limitation, the positions of line 804 and line 806 with respect to triangle wave 802 may be adjusted in response to the output from a feedback controller, such as from feedback controller 210 in FIG. 2.

In this example, a complete period of switching cycle 800 may run from time $t_1$ to time $t_6$. During time period 816, from time $t_1$ to time $t_2$, switch BL in the switch bridge is closed and switch AH in the switch bridge is open. Therefore, during time period 816, the switch bridge may be configured for coasting current as illustrated in FIG. 6. Switch AH is closed at time $t_2$. During time period 818, from time $t_2$ to time $t_3$, both switch BL and switch AH are closed. Therefore, during time period 818, the switch bridge may be configured for driving current as illustrated in FIG. 4.

Switch BL is opened at time $t_3$. During time period 820, from time $t_3$ to time $t_4$, switch BL is open and switch AH is closed. Therefore, during time period 820, the switch bridge may be configured for coasting current as illustrated in FIG. 5. At time $t_4$, switch BL is closed again. During time period 822, from time $t_4$ to time $t_5$, both switch BL and switch AH are closed and the switch bridge is again configured for driving as in time period 818. At time $t_5$, switch AH is opened. During time period 824, from time $t_5$ to time $t_6$, switch BL is closed and switch AH is open and the switch bridge is again configured for coasting as in time period 816.

In this example, the switch bridge is configured for driving current for approximately half of the time during switching cycle 800. During the other half of the time during switching cycle 800 the switch bridge is configured for coasting. Therefore, for example, without limitation, the duty cycle for switching cycle 800 may be referred to as a 50% duty cycle or a +50% duty cycle.

The output from a feedback controller may define the desired duty cycle for switching of the switches in a switch bridge as a single signed value in the range from 1 to −1. In this case, for example, without limitation, the switches in the switch bridge may be controlled as described for switching cycle 800 in response to an output value of 0.5 from the feedback controller.

Turning to FIG. 9, an illustration of switch timing for a switching cycle providing only coasting current for a motor is depicted in accordance with an illustrative embodiment. In this example, switching cycle 900 may be an example of one implementation of switching cycle 230 implemented in switch controller 232 for controlling the switches in switch bridge 204 in FIG. 2 or in switch bridge 300 in FIG. 3.

In this example, both line 804, defining the timing of the switching of switch AH in the switch bridge, and line 806, defining the timing of the switching of switch BL in the switch bridge, are positioned halfway between the peaks of triangle wave 802. In this case, switch BL is opened at the same time that switch AH is closed and switch AH is opened at the same time that switch BL is closed during switching cycle 900. Each switch AH and BL is opened and closed one time during the period of switching cycle 900.

Therefore, in this example, switch BL is closed and switch AH is open for approximately half of the time during switching cycle 900. During this time, the switch bridge may be configured for coasting current as illustrated in FIG. 6. Switch BL is open and switch AH is closed for the other half of the time during switching cycle 900. During this time the switch bridge may be configured for coasting current as illustrated in FIG. 5.

The switch bridge is thus configured for coasting current for approximately all of the time during switching cycle 900. Therefore, for example, without limitation, the duty cycle for switching cycle 900 may be referred to as a 0% duty cycle. The output from a feedback controller may define the desired duty cycle for switch bridge switching as a single signed value in the range from 1 to −1. In this case, for example, without limitation, the switches in the switch bridge may be controlled as described for switching cycle 900 in response to an output value of 0 from the feedback controller.

Turning to FIG. 10, an illustration of switch timing for a switching cycle providing coasting and regenerating current for a motor is depicted in accordance with an illustrative embodiment. In this example, switching cycle 1000 may be another example of one implementation of switching cycle 230 implemented in switch controller 232 for controlling the switches in switch bridge 204 in FIG. 2 or in switch bridge 300 in FIG. 3. As in previous examples, the positions of lines 804 and 806 with respect to triangle wave 802 may define the timing of the switching of switches AH and BL, respectively, in a switch bridge during switching cycle 1000.

In this example, a complete period of switching cycle 1000 may run from time $t_1$ to time $t_5$. During time period 1002, from time $t_1$ to time $t_2$, switch BL in the switch bridge is closed and switch AH in the switch bridge is open. Therefore, during time period 1002 the switch bridge may be configured for coasting current as illustrated in FIG. 6. Switch BL is opened at time $t_2$, when triangle wave 802 is falling and crosses line 806.

During time period 1004, from time $t_2$ to time $t_3$, both switch BL and switch AH are open. Therefore, during time period 1004 the switch bridge may be configured for regenerating current as illustrated in FIG. 7. Switch AH is closed at time $t_3$, when triangle wave 802 is falling and crosses line 804. During time period 1006, from time $t_3$ to time $t_4$, switch BL is open and switch AH is closed. Therefore, during time period 1006 the switch bridge may be configured for coasting current as illustrated in FIG. 5. At time $t_4$, switch AH is opened when triangle wave 802 is rising and crosses line 804. During time period 1008, from time $t_4$ to time $t_5$, both switch BL and switch AH are open and the switch bridge is again configured for regenerating as in time period 1004.

In this example, the switch bridge is configured for regenerating current for approximately half of the time during switching cycle 1000. During the other half of the time during switching cycle 1000, the switch bridge is configured for coasting. Regenerating current is in the opposite direction to driving current in a motor. Therefore, for example, without limitation, the duty cycle for switching cycle 1000 may be referred to as a −50% duty cycle.

The output from a feedback controller may define the desired duty cycle for the switching of the switch bridge as a single signed value in the range from 1 to −1. In this case, for example, without limitation, the switches in the switch bridge may be controlled as described for switching cycle 1000 in response to an output value of −0.5 from the feedback controller.

Figure 11:
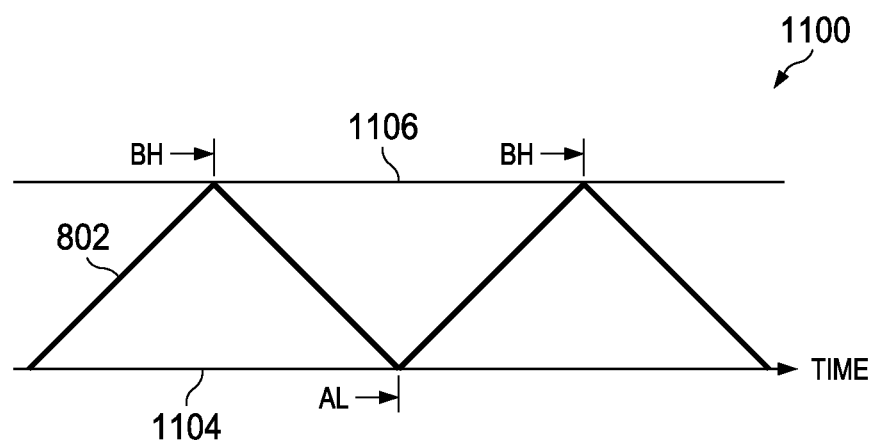
FIG. 11 is an illustration of switch timing for a switching cycle providing only regenerating current for a motor in accordance with an illustrative embodiment.

Turning to FIG. 11, an illustration of switch timing for a switching cycle providing only regenerating current for a motor is depicted in accordance with an illustrative embodiment. In this example, switching cycle 1100 may be another example of one implementation of switching cycle 230 implemented in switch controller 232 for controlling the switches in switch bridge 204 in FIG. 2 or switch bridge 300 in FIG. 3.

The example switching cycles in FIGS. 8-10 are for controlling the current in one set of windings of a motor operating in the first quadrant of operation. In contrast, switching cycle 1100 is an example of a switching cycle for controlling the current in the same set of windings of the motor when the motor is operating in the fourth quadrant of operation.

The directions of currents in the windings for driving, coasting, and regenerating in the fourth quadrant of operation may be opposite to the directions of the currents in the windings for driving, coasting, and regenerating in the first quadrant of operation. Therefore, the switches in the switch bridge that are controlled during a switching cycle in the fourth quadrant of operation may be different from the switches in the switch bridge that are controlled during a switching cycle in the first quadrant of operation to provide the desired driving, coasting, and regenerating currents for motor operation in the fourth quadrant that are in the opposite direction to the currents for motor operation in the first quadrant.

For example, in FIGS. 8-10 switches AH and BL in a switch bridge are controlled during a switching cycle to control the current in the motor windings for a motor operating in the first quadrant. In contrast, switches AL and BH in the switch bridge are controlled during switching cycle 1100 to control the current in the same windings for the motor operating in the fourth quadrant.

In this example, the position of line 1104 with respect to triangle wave 802 may define the timing of the switching of switch AL in the switch bridge during switching cycle 1100. For example, switch AL may be closed when triangle wave 802 is falling and crosses line 1104 and may be opened when triangle wave 802 is rising and crosses line 1104. Similarly, the position of line 1106 with respect to triangle wave 802 may define the timing of the switching of switch BH in the switch bridge during switching cycle 1100. For example, switch BH may be closed when triangle wave 802 is climbing and crosses line 1106 and may be opened when triangle wave 802 is falling and crosses line 1106.

The positions of line 1104 and line 1106 with respect to triangle wave 802, thus, may define how much time during each switching cycle the switch bridge is configured for driving, coasting, or regenerating current in the windings of a motor. Therefore, the positions of line 1104 and line 1106 with respect to triangle wave 802 may be adjusted by a motor controller as appropriate to achieve the desired current in the motor windings. For example, without limitation, the positions of line 1104 and line 1106 with respect to triangle wave 802 may be adjusted in response to the output from a feedback controller, such as from feedback controller 210 in FIG. 2.

In this example, line 1104 and line 1106 are positioned at opposite peaks of triangle wave 802 such that triangle wave 802 never crosses lines 1104 and 1106. In this case, switches AL and BH may both remain open throughout switching cycle 1100. Therefore, the switch bridge may be configured for providing only regenerating current in the motor windings for all of switching cycle 1100.

Currents in the motor windings during operation of the motor in the fourth quadrant of operation are in the opposite direction to currents in the motor windings during operation of the motor in the first quadrant of operation. Therefore, regenerating current in the windings during operation of the motor in the fourth quadrant of operation is in the same direction as driving current in the windings during operation of the motor in the first quadrant of operation. Therefore, for example, without limitation, the duty cycle for switching cycle 1100, in which the switch bridge is configured for regenerating current in the motor windings for approximately all of the time of switching cycle 1100, may be referred to as a 100% duty cycle.

The output from a feedback controller may define the desired duty cycle for switching of the switches in a switch bridge as a single signed value in the range from 1 to −1. In this case, for example, without limitation, the switches in the switch bridge may be controlled as described for switching cycle 1100 during operation of a motor in the fourth quadrant of operation in response to an output value of 1 from the feedback controller.

Figure 12:
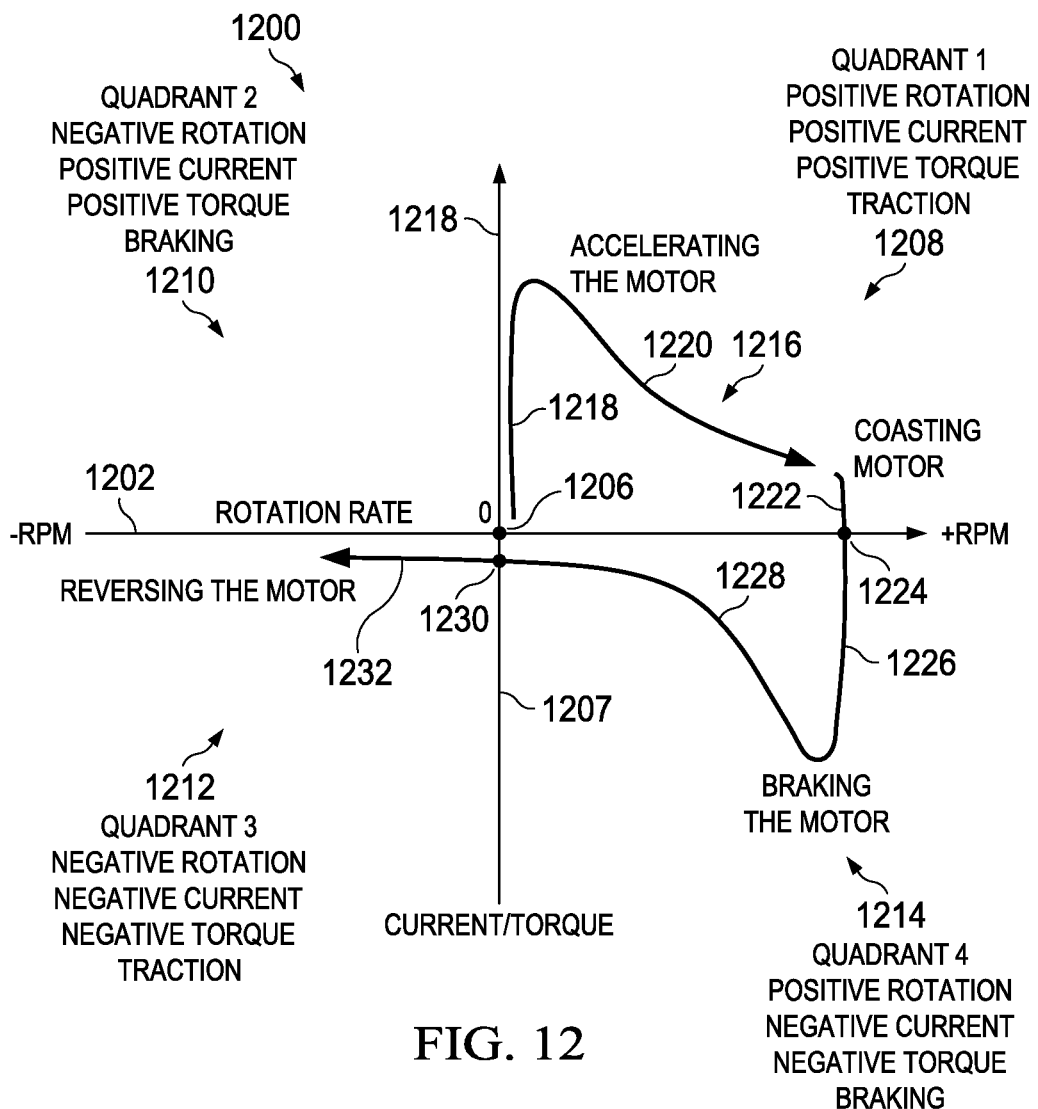
FIG. 12 is an illustration of the quadrants of operation of a motor in accordance with an illustrative embodiment.

Turning to FIG. 12, an illustration of the quadrants of operation of a motor are depicted in accordance with an illustrative embodiment. In this example, quadrants of operation 1200 of a motor may be examples of quadrants of operation of motor 101 in FIG. 1. Quadrants of operation 1200 may be defined with reference to the rotation rate of the motor and the current in the motor windings.

In this example, the rotation rate of the motor is identified with reference to horizontal axis 1202. For example, without limitation, the rotation rate of the motor may be the speed of the rotor expressed in revolutions per minute, RPM, or using any other appropriate units for indicating how fast the rotor is spinning.

The rotation rate of the motor at point 1206 on horizontal axis 1202 is zero. Therefore, point 1206 on horizontal axis 1202 corresponds to no rotation of the motor in either direction.

Points to the right of point 1206 on horizontal axis 1202 correspond to rotation of the motor in a first direction of rotation. Points further to the right of point 1206 on horizontal axis 1202 correspond to faster rotation of the motor in the first direction of rotation. For example, without limitation, points to the right of point 1206 on horizontal axis 1202 may correspond to rotation of the motor in a clockwise direction. Points to the right of point 1206 on horizontal axis 1202 may be identified by positive numbers. Therefore, rotation of the motor in the first direction of rotation may be referred to as positive rotation.

Points to the left of point 1206 on horizontal axis 1202 correspond to rotation of the motor in a second direction of rotation. Points further to the left of point 1206 on horizontal axis 1202 correspond to faster rotation of the motor in the second direction of rotation. The second direction of rotation may be referred to as the opposite direction of rotation with respect to the first direction of rotation.

Similarly, the first direction of rotation may be referred to as the opposite direction of rotation with respect to the second direction of rotation. For example, without limitation, points to the left of point 1206 on horizontal axis 1202 may correspond to rotation of the motor in a counter-clockwise direction. Points to the left of point 1206 on horizontal axis 1202 may be identified by negative numbers. Therefore, rotation of the motor in the second direction of rotation may be referred to as negative rotation.

In this example, the current in the windings of the motor is identified with reference to vertical axis 1207. For example, without limitation, the current in the motor windings may be identified using any appropriate units of current. The direction and magnitude of torque produced by the motor may vary directly with the direction and magnitude of current in the motor windings. Therefore, the current in the motor windings also may be identified using any appropriate units of torque. In this case, the torque produced by the motor may be identified with reference to vertical axis 1207 and quadrants of operation 1200 may be defined with reference to the rotation rate of the motor and the torque produced by the motor.

The current in the motor windings and torque produced by the motor at point 1206 on vertical axis 1207 is zero. Therefore, point 1206 on vertical axis 1207 corresponds to no current in the motor windings in either direction and no torque produced by the motor in either direction.

Points above point 1206 on vertical axis 1207 correspond to current in the motor windings in a first current direction and torque produced by the motor in the first direction of rotation. Points further above point 1206 on vertical axis 1207 correspond to greater magnitudes of current in the first current direction and greater torque in the first direction of rotation. For example, without limitation, points above point 1206 on vertical axis 1207 may correspond to torque in the clockwise direction. Points above point 1206 on vertical axis 1207 may be identified by positive numbers. Therefore, current in the first current direction may be referred to as positive current or current in a positive direction and torque in the first direction of rotation may be referred to as positive torque.

Points below point 1206 on vertical axis 1207 correspond to current in the motor windings in a second current direction and torque produced by the motor in the second direction of rotation. Points further above point 1206 on vertical axis 1207 correspond to greater magnitudes of current in the second current direction and greater torque in the second direction of rotation. The second current direction may be referred to as the opposite direction of current with respect to the first current direction.

Similarly, the first current direction may be referred to as the opposite direction of current with respect to the second current direction. For example, without limitation, points below point 1206 on vertical axis 1207 may correspond to torque in the counter-clockwise direction. Points below point 1206 on vertical axis 1207 may be identified by negative numbers. Therefore, current in the second current direction may be referred to as negative current or current in a negative direction and torque in the second direction of rotation may be referred to as negative torque.

A motor may be operating in quadrant 1 1208 when the motor is rotating in the first direction of rotation and the current in the windings of the motor is in the first current direction to produce torque in the first direction of rotation. Therefore, in this example, operation of the motor in quadrant 1 1208 may be characterized by positive rotation, positive current, and positive torque.

The motor may be operating in quadrant 2 1210 when the motor is rotating in the second direction of rotation and the current in the windings of the motor is in the first current direction to produce torque in the first direction of rotation. Therefore, in this example, operation of the motor in quadrant 2 1210 may be characterized by negative rotation, positive current, and positive torque.

The motor may be operating in quadrant 3 1212 when the motor is rotating in the second direction of rotation and the current in the windings of the motor is in the second current direction to produce torque in the second direction of rotation. Therefore, in this example, operation of the motor in quadrant 3 1212 may be characterized by negative rotation, negative current, and negative torque.

The motor may be operating in quadrant 4 1214 when the motor is rotating in the first direction of rotation and the current in the windings of the motor is in the second current direction to produce torque in the second direction of rotation. Therefore, in this example, operation of the motor in quadrant 4 1214 may be characterized by positive rotation, negative current, and negative torque.

In quadrant 1 1208 and quadrant 3 1212 the current in the motor windings produces torque that is in the same direction as the direction of rotation of the motor. Therefore, in quadrant 1 1208 and quadrant 3 1212 the torque produced by the motor supports the rotation of the motor. Operation of the motor in quadrant 1 1208 and quadrant 3 1212 may be referred to as traction. The directions of rotation of a motor operating in quadrant 1 1208 and quadrant 3 1212 are reversed. Therefore, quadrant 3 1212 may be referred to as a reverse traction quadrant of operation with respect to quadrant 1 1208. Quadrant 1 1208 may be referred to as a reverse traction quadrant of operation with respect to quadrant 3 1212.

In quadrant 2 1210 and quadrant 4 1214, the current in the motor windings produces torque that is in the direction opposite to the direction of rotation of the motor. Therefore, in quadrant 2 1210 and quadrant 4 1214, the torque produced by the motor opposes the rotation of the motor. Operation of the motor in quadrant 2 1210 and quadrant 4 1214 may be referred to as braking.

In one example, line 1216 illustrates the changing rate of rotation, winding current, and torque of a motor as the motor is operated in several quadrants of operation 1200. Operation of the motor may begin in quadrant 1 1208. Line segment 1218 indicates an initial relatively large increase in the current in the motor windings in the positive direction. This relatively large increase in current produces a corresponding large increase in torque in the first direction of rotation, causing the motor to begin rotating in the first direction of rotation.

Line segment 1220 indicates that the positive current in the windings, and thus the torque in the first direction of rotation, may be maintained to accelerate the rate of rotation of the motor in the first direction of rotation to a desired coasting speed. Line segment 1220 indicates that the magnitude of the positive current, and thus the torque produced in the first direction of rotation, may be reduced gradually after rotation of the motor is started and as the rate of rotation of the motor is accelerated to the desired coasting speed. Line segment 1222 indicates that the magnitude of the positive current in the motor windings, and thus the torque produced in the first direction of rotation, may be reduced further as the rate of rotation of the motor is maintained at the desired coasting speed.

At point 1224, operation of the motor changes from quadrant 1 1208 to quadrant 4 1214. Line segment 1226 indicates a relatively large increase in the current in the motor windings in the negative direction. This relatively large increase in negative current produces a corresponding large increase in torque in the second direction of rotation. The torque produced by the motor now opposes the rotation of the motor, causing the motor to begin braking.

Line segment 1228 indicates that the negative current in the windings, and thus the torque in the second direction of rotation, is maintained to reduce the rate of rotation of the motor in the first direction of rotation. Line segment 1228 indicates that the magnitude of the negative current, and thus the torque produced in the second direction of rotation, may be reduced gradually during braking as the rate of rotation of the motor is reduced.

At point 1230, the operation of the motor changes from quadrant 4 1214 to quadrant 3 1212. At point 1230, the direction of rotation of the motor is reversed from the first direction of rotation to the second direction of rotation. Line segment 1232 indicates that the negative current in the motor windings, and thus the torque produced in the second direction of rotation, may be maintained to accelerate the rate of rotation of the motor in the second direction of rotation.

Figure 13:
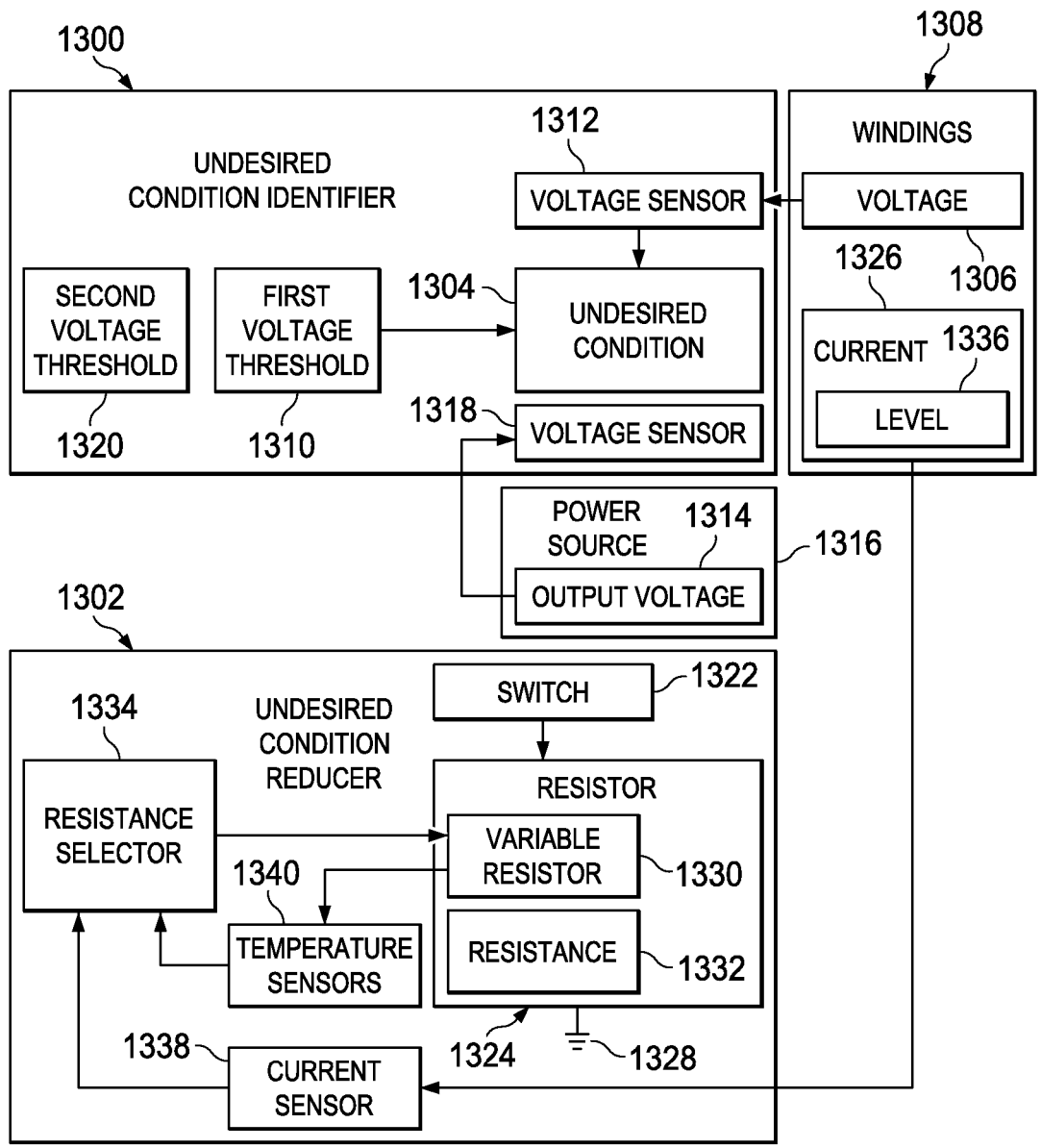
FIG. 13 is an illustration of a block diagram of an undesired condition identifier and an undesired condition reducer for reducing instability in the current in a motor in accordance with an illustrative embodiment.

Turning to FIG. 13, an illustration of a block diagram of an undesired condition identifier and an undesired condition reducer for reducing instability in the current in a motor is depicted in accordance with an illustrative embodiment. Undesired condition identifier 1300 and undesired condition reducer 1302 may be examples of implementations of undesired condition identifier 240 and undesired condition reducer 254, respectively, in FIG. 2.

Undesired condition identifier 1300 is configured to identify undesired condition 1304 when voltage 1306 across windings 1308 is greater than first voltage threshold 1310. Voltage 1306 across windings 1308 may be identified using an appropriate voltage sensor 1312. First voltage threshold 1310 may be defined with respect to output voltage 1314 of power source 1316. For example, without limitation, first voltage threshold 1310 may be approximately equal to output voltage 1314 of power source 1316. Output voltage 1314 of power source 1316 may be identified using appropriate voltage sensor 1318.

Undesired condition identifier 1300 also may be configured to identify when voltage 1306 across windings 1308 is less than second voltage threshold 1320. Second voltage threshold 1320 is lower than first voltage threshold 1310.

Undesired condition reducer 1302 may include switch 1322 and resistor 1324. Switch 1322 may be an appropriate solid state switch. Undesired condition reducer 1302 may be configured to close switch 1322 to direct current 1326 in windings 1308 to ground through resistor 1324 in response to undesired condition 1304 identified by undesired condition identifier 1300. Undesired condition reducer 1302 may be configured to open switch 1322, to cease directing current 1326 through resistor 1324 to ground 1328, when voltage 1306 across windings 1308 is lower than second voltage threshold 1320.

Resistor 1324 may comprise variable resistor 1330. In this case, resistance 1332 of resistor 1324 may be set by resistance selector 1334 based on level 1336 of current 1326 in windings 1308. For example, a higher resistance 1332 may be selected by resistance selector 1334 in response to a higher level 1336 of current 1326 in windings 1308. Level 1336 of current 1326 in windings 1308 may be identified using an appropriate current sensor 1338.

Variable resistor 1330 may comprise a plurality of resistors. In this case, resistance selector 1334 may select a number of the plurality of resistors in variable resistor 1330 to provide appropriate resistance 1332 based on temperatures of the plurality of resistors to prevent overheating of the resistors in variable resistor 1330. The temperatures of the resistors in variable resistor 1330 may be determined using appropriate temperature sensors 1340.

Turning to FIG. 14, an illustration of a schematic circuit diagram of a switch bridge and a switch and resistor for directing current in a motor winding to ground is depicted in accordance with an illustrative embodiment. Switch 1402 and resistor 1404 may be examples of switch 1322 and resistor 1324, respectively, in FIG. 13.

In this example, switch bridge 1400 is configured to couple winding 1406 of a motor to a power source connected between terminal 1408 and ground 1410. Current in winding 1406 is directed to ground 1410 via resistor 1404 when switch 1402 is closed. Diode 1412 is connected between switch bridge 1400 and switch 1402 to prevent shorting of the power source through switch 1402 when switch 1402 is closed.

Figure 15:
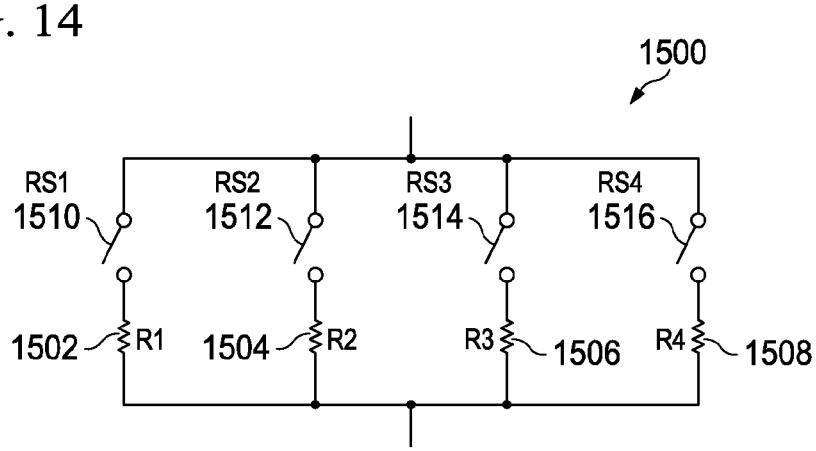
FIG. 15 is an illustration of a schematic circuit diagram of a discrete valued variable resistor in accordance with an illustrative embodiment.

Turning to FIG. 15, an illustration of a schematic circuit diagram of a discrete valued variable resistor is depicted in accordance with an illustrative embodiment. Variable resistor 1500 is an example of one implementation of variable resistor 1330 in FIG. 13.

Variable resistor 1500 comprises four resistors 1502, 1504, 1506, and 1508 connected in parallel. Switches 1510, 1512, 1514, and 1516 are connected in series with resistors 1502, 1504, 1506, and 1508, respectively. A variable resistor in accordance with an illustrative embodiment may have more or fewer than four resistors and switches. The resistance of resistors 1502, 1504, 1506, and 1508 may be the same or different. The resistance of variable resistor 1500 is selected by closing appropriate ones of switches 1510, 1512, 1514, and 1516.

Figure 16:
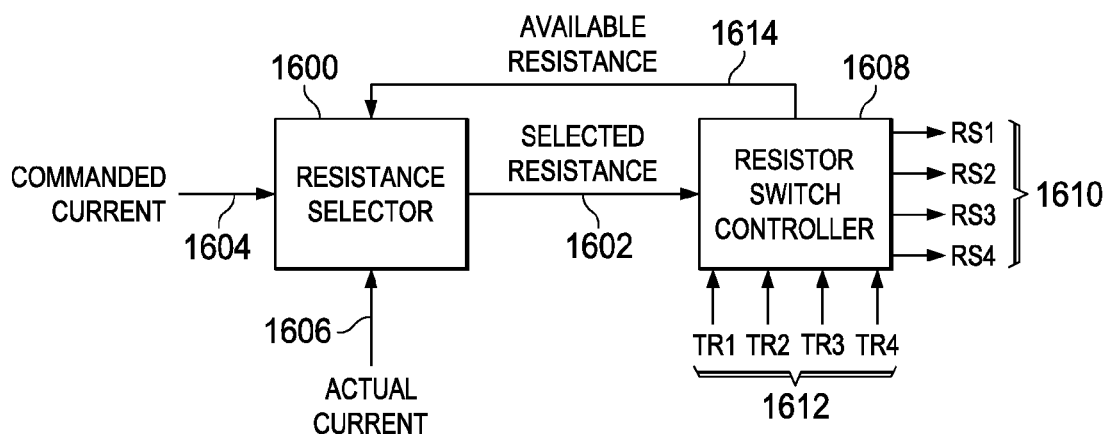
FIG. 16 is an illustration of a block diagram of a resistance selector in accordance with an illustrative embodiment.

Turning to FIG. 16, an illustration of a block diagram of a resistance selector is depicted in accordance with an illustrative embodiment. Resistance selector 1600 is an example of one implementation of resistance selector 1334 in FIG. 13. In this example, resistance selector 1600 is configured for selecting the resistance provided by variable resistor 1500 in FIG. 15.

Resistance selector 1600 may be configured to determine selected resistance 1602 based on the difference between commanded current 1604 and actual current 1606 in the windings of a motor. Selected resistance 1602 may be provided to resistor switch controller 1608. Resistor switch controller 1608 may be configured to generate control signals 1610 for controlling switches to select a number of resistors in a variable resistor comprising a plurality of resistors connected in parallel.

Resistor switch controller 1608 may be configured to use temperature information 1612 for the plurality of resistors in the variable resistor to select which of the plurality of resistors should be used to provide selected resistance 1602. Temperature information 1612 may be used to select the resistors to be used to prevent overheating of the resistors in the variable resistor. Temperature information 1612 may be used to identify resistors in the variable resistor that should or should not be used based on risk of overheating, and thus may affect available resistance 1614 of the variable resistor. Available resistance 1614 may be provided to resistance selector 1600 and used by resistance selector 1600 to determine selected resistance 1602.

Figure 17:
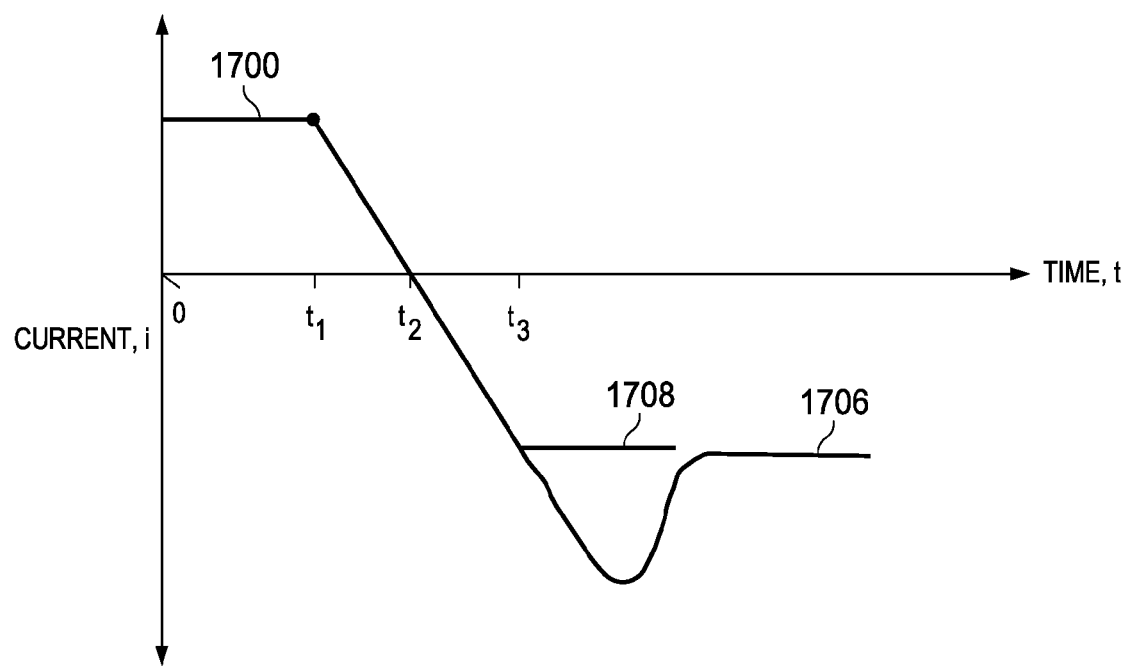
FIG. 17 is an illustration of current in the windings of a motor in accordance with an illustrative embodiment.

Turning to FIG. 17, an illustration of current in the windings of a motor is depicted in accordance with an illustrative embodiment. For example, line 1700 may indicate current 1326 in windings 1308 in FIG. 13.

In this example, a motor is operating in Quadrant 1 from time 0 to time t1. In Quadrant 1 the motor is driving and the current in the motor is positive. At time t1 the motor is instructed to begin braking. In response, the motor controller controls the switching bridge to reverse the current in the motor windings. As a result, at time t2 the motor begins operating in Quadrant 4. In Quadrant 4 the motor is regenerating and the current in the motor is negative.

When the motor is regenerating in Quadrant 4 the voltage across the motor windings climbs higher than the power supply voltage at time t3, resulting in an undesired current spike 1706. In accordance with an illustrative embodiment, the undesired condition of the voltage across the motor windings climbing higher than the power supply voltage may be identified at time t3 and the current in the windings may be directed through a resistor to ground in response. In this case, the current in the windings remains well controlled, as indicated by line segment 1708.

Figure 18:
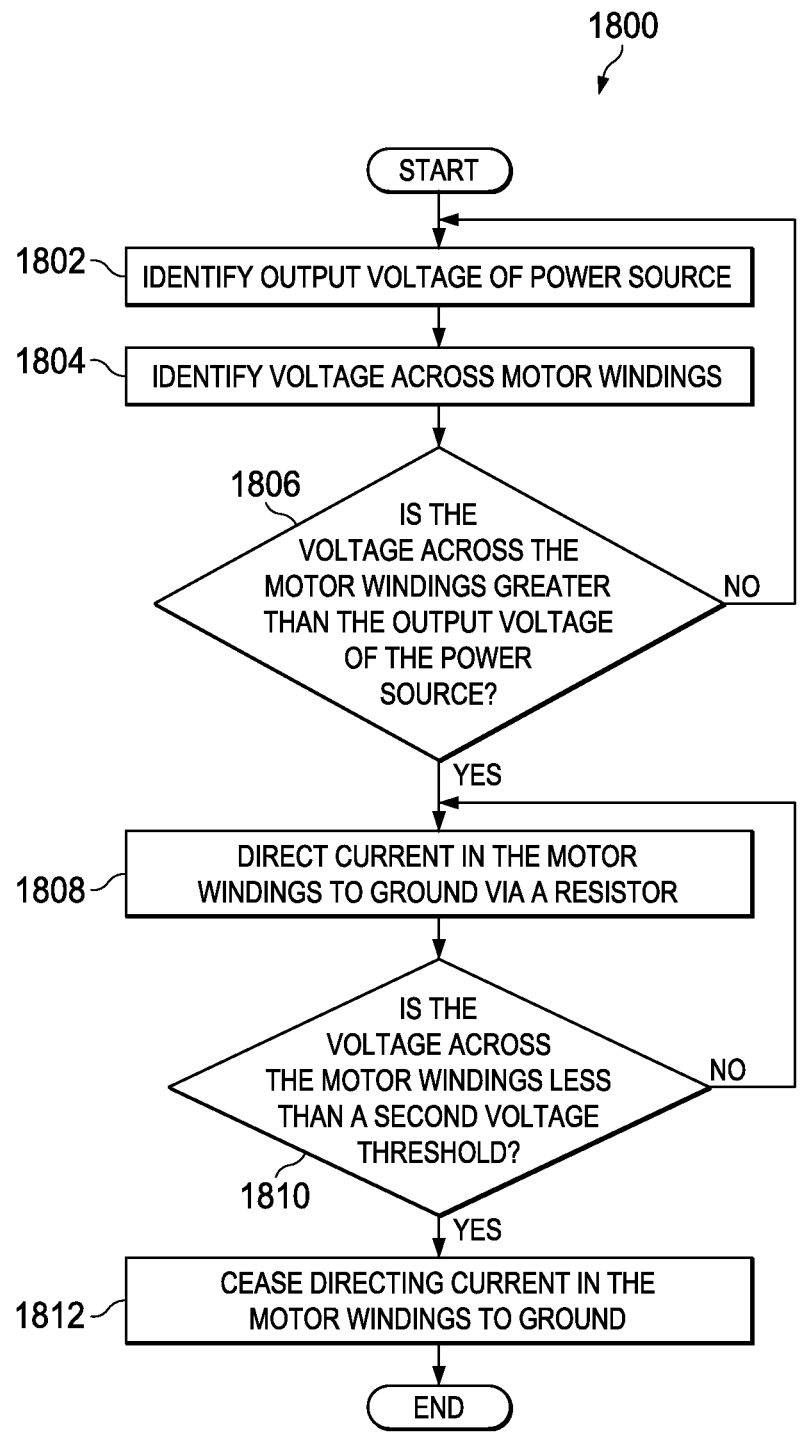
FIG. 18 is an illustration of a flowchart of a process for reducing instability in a motor in accordance with an illustrative embodiment.

Turning to FIG. 18, an illustration of a flowchart of a process for reducing instability in a motor is depicted in accordance with an illustrative embodiment. For example, process 1800 may be performed by undesired condition identifier 1300 and undesired condition reducer 1302 in FIG. 13.

Process 1800 may begin by identifying the output voltage of a power source (operation 1802). The voltage across the motor windings of a motor being powered by the power source is also identified (operation 1804). It is then determined whether the voltage across the motor windings is greater than the output voltage of the power source (operation 1806). Process 1800 may repeat identifying the output voltage of the power source at operation 1802 and identifying the voltage across the motor windings at operation 1804 until a determination is made at operation 1806 that the voltage across the motor windings is greater than the output voltage of the power source.

In response to a determination that the voltage across the windings is greater than the output voltage of the power source, the current in the motor windings is directed to ground via a resistor (operation 1808). It then is determined whether the voltage across the motor windings is less than a second voltage threshold (operation 1810). Current in the motor windings may continue to be directed to ground via the resistor at operation 1808 until it is determined at operation 1810 that the voltage across the motor windings is less than the second voltage threshold. The second voltage threshold may be less than the output voltage of the power source. For example, without limitation, the second voltage threshold may be approximately 20 volts less than the output voltage of the power source or less than the output voltage of the power source by any other appropriate amount. The directing of the current in the motor windings to ground may cease (operation 1812) when the voltage across the motor windings is determined to be less than the second voltage threshold, with the process terminating thereafter.

Figure 19:
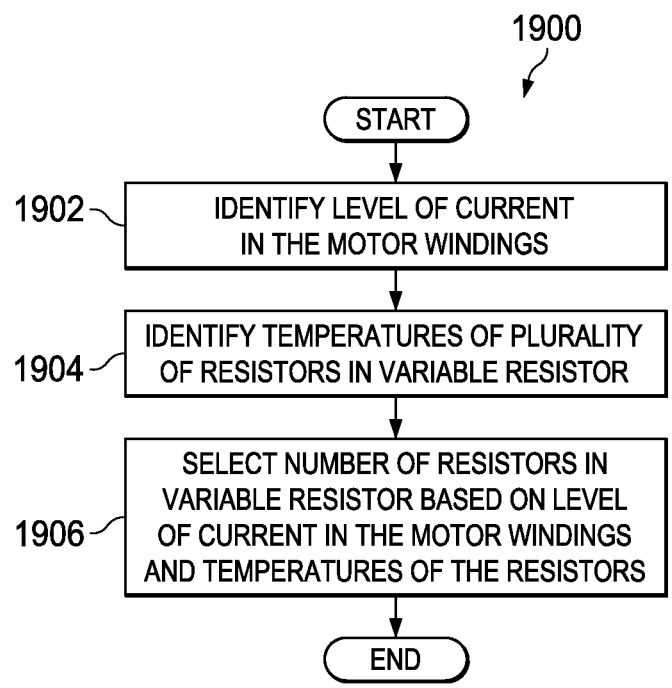
FIG. 19 is an illustration of a flowchart of a process for selecting the resistance of a variable resistor in accordance with an illustrative embodiment.

Turning to FIG. 19, an illustration of a flowchart of a process for selecting the resistance of a variable resistor is depicted in accordance with an illustrative embodiment. For example, process 1900 may be performed by resistance selector 1334 in FIG. 13.

Process 1900 may begin by identifying a level of current in the windings of a motor (operation 1902). The temperatures of a plurality of resistors in a variable resistor may be identified (operation 1904). A number of the plurality of resistors in the variable resistor is then selected based on the level of current in the motor windings and the temperatures of the resistors (operation 1906), with the process terminating thereafter.

Figure 20:
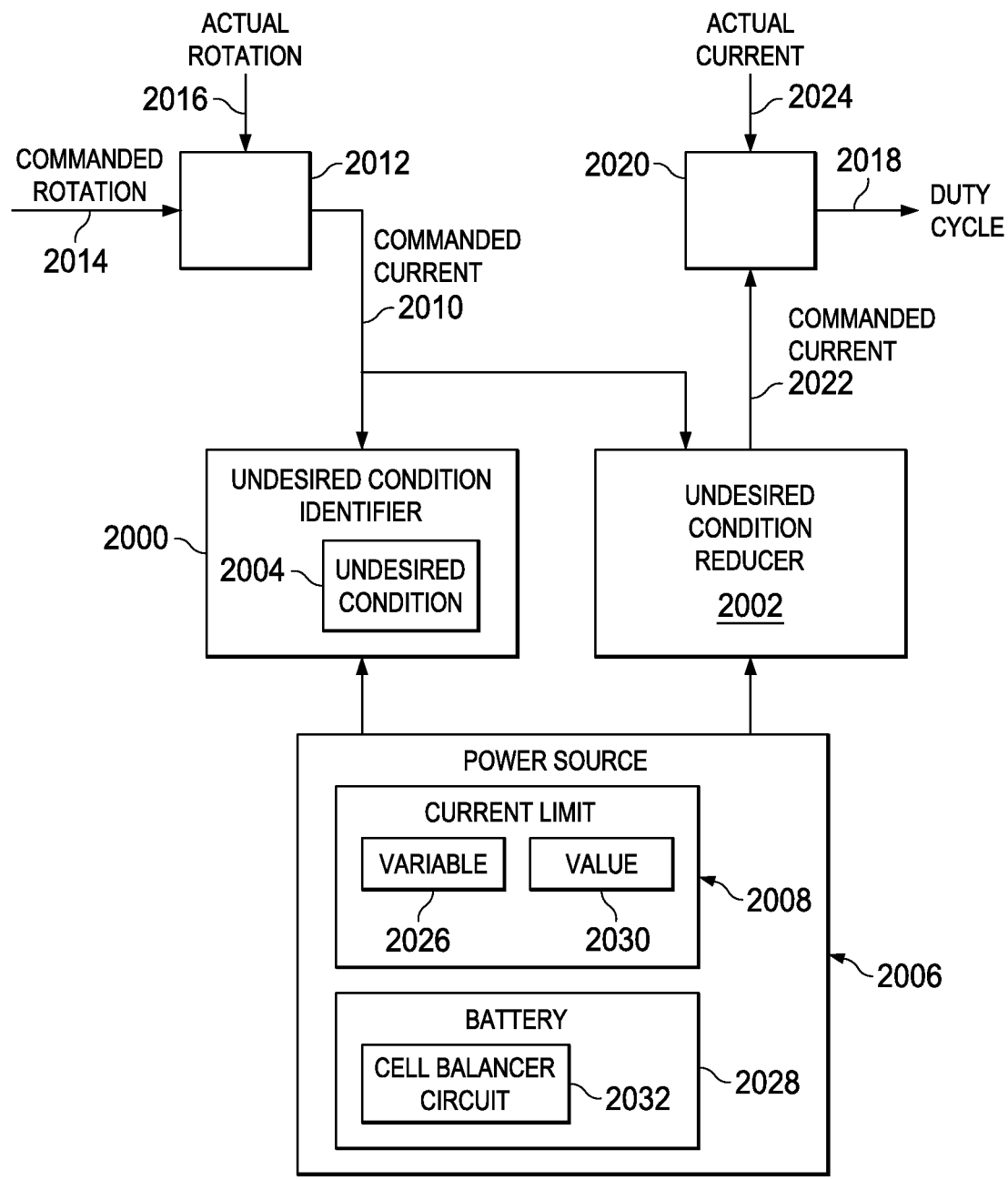
FIG. 20 is an illustration of a block diagram of an undesired condition identifier and an undesired condition reducer for protecting a power source from undesired current during operation of a motor in accordance with an illustrative embodiment.

Turning to FIG. 20, an illustration of a block diagram of an undesired condition identifier and an undesired condition reducer for protecting a power source from undesired current during operation of a motor is depicted in accordance with an illustrative embodiment. Undesired condition identifier 2000 and undesired condition reducer 2002 are examples of one implementation of undesired condition identifier 240 and undesired condition reducer 254, respectively, in FIG. 2.

Undesired condition identifier 2000 is configured to identify undesired condition 2004 wherein the flow of current between a motor and power source 2006 is greater than current limit 2008 for power source 2006. For example, undesired condition 2004 may be identified when commanded current 2010 for the windings of the motor is greater than current limit 2008. For example, without limitation, commanded current 2010 may be determined at block 2012 based on the difference between commanded rotation 2014 for the motor and actual rotation 2016 for the motor.

Undesired condition reducer 2002 is configured to control duty cycle 2018 for controlling the motor such that the current between the motor and power source 2006 does not exceed current limit 2008 of power source 2006. For example, duty cycle 2018 may be determined at block 2020 based on the difference between commanded current 2022 and actual current 2024 in the windings of the motor. Undesired condition reducer 2002 may set commanded current 2022 based on current limit 2008 in response to undesired condition 2004 identified by undesired condition identifier 2000. Otherwise, commanded current 2010 may be used to determine duty cycle 2018.

Current limit 2008 of power source 2006 may be variable 2026. For example, power source 2006 may comprise battery 2028. In this case, value 2030 for current limit 2008 may be determined using feedback from cell balancer circuit 2032 for battery 2028.

Figure 21:
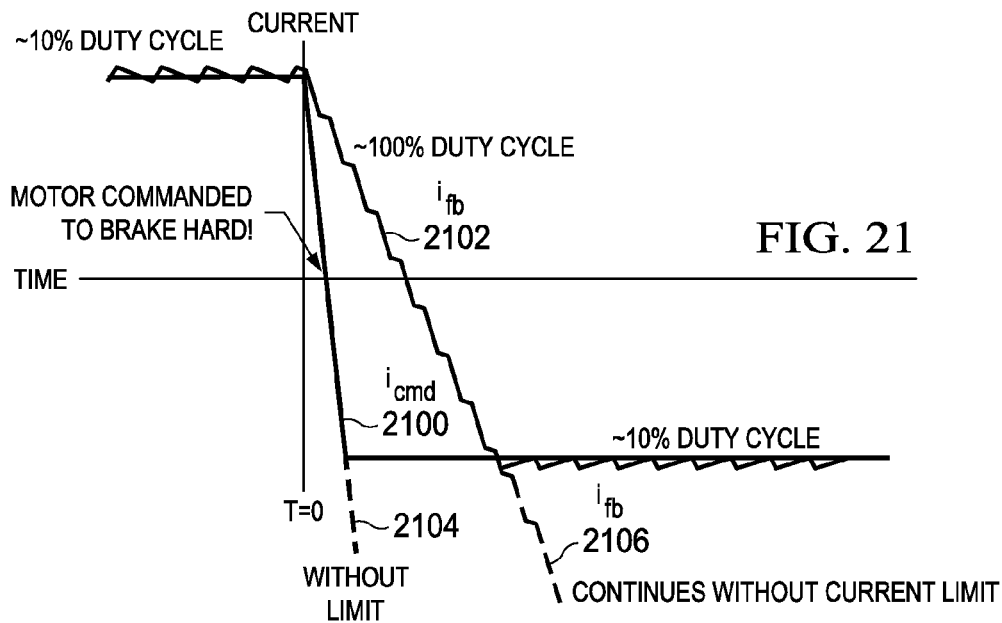
FIG. 21 is an illustration of a waveform diagram of current control for protecting a power source from undesired current during operation of a motor in accordance with an illustrative embodiment.

Turning to FIG. 21, an illustration of a waveform diagram of current control for protecting a power source from undesired current during operation of a motor is depicted in accordance with an illustrative embodiment. In this example, line 2100 indicates the commanded current for the windings of a motor and line 2102 indicates the actual current in the windings of the motor.

Before time 0 the motor is driving and the duty cycle for the motor is maintained approximately steady at about ten percent. At time 0, the motor is commanded to brake hard. In response, the commanded current reverses direction. The duty cycle is changed to 100 percent in the reverse direction, to change the direction of the current in the windings as quickly as possible. In this example, the commanded current is limited to the current limit of the power source for the motor.

Dashed line segment 2104 indicates that the magnitude of the command current would be larger if it was not limited by the current limit of the power source. In this case, the magnitude of the current in the windings would exceed the current limit of the power supply, as shown by dashed line segment 2106.

Figure 22:
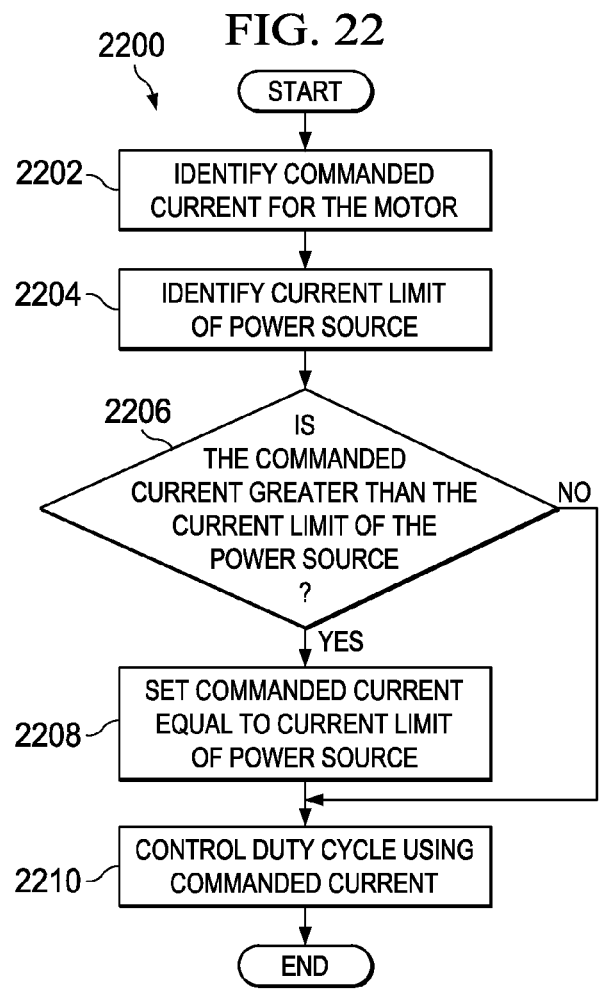
FIG. 22 is an illustration of a flowchart of a process for protecting a power source from undesired current during operation of a motor in accordance with an illustrative embodiment.

Turning to FIG. 22, an illustration of a flowchart of a process for protecting a power source from undesired current during operation of a motor is depicted in accordance with an illustrative embodiment. For example, process 2200 may be performed by undesired condition identifier 2000 and undesired condition reducer 2002 in FIG. 20.

Process 2200 may begin by identifying a commanded current for the motor (operation 2202). A current limit of the power source also is identified (operation 2204). It then is determined whether the commanded current is greater than the current limit of the power source (operation 2206). The commanded current is set equal to the current limit of the power source (operation 2208) in response to determining at operation 2206 that the commanded current identified in operation 2202 is greater than the current limit of the power source. The duty cycle for controlling the current in the motor windings is then controlled using the commanded current (operation 2210), with the process terminating thereafter.

The different illustrative embodiments can take the form of an entirely hardware embodiment, an entirely software embodiment, or an embodiment containing both hardware and software elements. Some embodiments are implemented in software, which includes, but is not limited to, forms such as, for example, without limitation, firmware, resident software, and microcode.

Furthermore, the different embodiments can take the form of a computer program product accessible from a computer usable or computer readable medium providing program code for use by, or in connection with, a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O, devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples such as modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
   a motor comprising windings;
   a switch bridge comprising a plurality of switches configured to couple a power source to the windings;
   a motor controller configured to control the plurality of switches and a duty cycle, wherein a number of the plurality of switches in the switch bridge is closed during the duty cycle to provide a current between the power source and the windings in response to a commanded current;
   an undesired condition identifier configured to identify an undesired condition in the apparatus when the motor is providing power to the power source, wherein the undesired condition is defined with respect to a characteristic of the power source, and wherein the undesired condition is identified when the commanded current is greater than a current limit for the power source; and
   an undesired condition reducer configured to reduce the undesired condition in response to identifying the undesired condition in the apparatus by the undesired condition identifier, wherein the undesired condition reducer is configured to set the commanded current based on the current limit for the power source when the undesired condition is identified when the commanded current is greater than the current limit for the power source.

2. The apparatus of claim 1, wherein:
   in being configured to identify the undesired condition in the apparatus when the motor is providing the power to the power source, the undesired condition identifier is configured to identify the undesired condition in the apparatus when a voltage across the windings is greater than a first voltage threshold, wherein the first voltage threshold is defined with respect to an output voltage of the power source; and
   in being configured to reduce the undesired condition in response to identifying the undesired condition in the apparatus, the undesired condition reducer is configured to direct a current in the windings to ground via a resistor in response to identifying the undesired condition in the apparatus.

3. The apparatus of claim 2, wherein the first voltage threshold is approximately equal to the output voltage of the power source.

4. The apparatus of claim 2, wherein:
   the undesired condition identifier is further configured to identify when the voltage across the windings is less than a second voltage threshold, wherein the second voltage threshold is lower than the first voltage threshold; and
   the undesired condition reducer is configured to cease directing the current in the windings to ground in response to identifying when the voltage across the windings is less than the second voltage threshold.

5. The apparatus of claim 2, wherein:
   the resistor is a variable resistor; and the undesired condition reducer is further configured to select a resistance of the variable resistor in response to a level of the current in the windings.

6. The apparatus of claim 5, wherein:
the resistor comprises a plurality of resistors in parallel; and
the undesired condition reducer is further configured to select a number of resistors in the plurality of resistors through which the current in the windings is directed to ground based on temperatures of the plurality of resistors.

7. The apparatus of claim 1, wherein:
the current limit for the power source is variable;
the power source comprises a battery; and
the undesired condition identifier is further configured to select a value for the current limit based on feedback from a cell balancer circuit for the battery.

8. The apparatus of claim 1, wherein the apparatus is on an aircraft.

9. A method of controlling a motor comprising:
controlling a plurality of switches in a switch bridge to couple a battery to windings of the motor, wherein a duty cycle during which a number of the plurality of switches are closed to provide a current between the battery and the windings is limited such that the current between the battery and the windings does not exceed a variable current limit for the battery, wherein a value for the variable current limit is selected based on feedback from a cell balancer circuit for the battery.

10. The method of claim 9 further comprising:
determining when a commanded current is greater than the value for the variable current limit for the battery;
setting the commanded current based on the value for the variable current limit for the battery when the commanded current is greater than the value for the variable current limit for the battery; and
controlling the duty cycle in response to the commanded current.

11. The method of claim 9, wherein the current between the battery and the windings is the current between the motor and the battery when the motor is providing power to the battery.

12. The method of claim 9, wherein the current between the battery and the windings is the current between the battery and the motor when power is provided from the battery to the motor.

13. An apparatus comprising:
a motor comprising windings;
a switch bridge comprising a plurality of switches configured to couple the windings to a battery having a variable current limit, wherein a value for the variable current limit is selected based on feedback from a cell balancer circuit for the battery;
a motor controller configured to limit a current between the battery and the windings during a duty cycle by controlling the plurality of switches such a number of the plurality of switches are closed to provide a current between the battery and the windings that does not exceed the value for the variable current limit.

14. The apparatus of claim 13 further comprising:
an undesired condition identifier configured to identify when a commanded current is greater than the value for the variable current limit; and
wherein the motor controller is further configured to set the commanded current based on the value for the variable current limit when the commanded current is greater than the value for the variable current limit, and to control the duty cycle in response to the commanded current.

15. The apparatus of claim 13, wherein the current between the battery and the windings is the current between the motor and the battery when the motor is providing power to the battery.

16. The apparatus of claim 13, wherein the current between the battery and the windings is the current between the battery and the motor when power is provided from the battery to the motor.

17. A method of controlling a motor comprising:
controlling a plurality of switches in a switch bridge according to a duty cycle, wherein a number of the plurality of switches in the switch bridge is closed during the duty cycle to provide a current between a power source and windings of the motor in response to a commanded current;
identifying an undesired condition when the motor is providing power to the power source, wherein the undesired condition is defined with respect to a characteristic of the power source, wherein the undesired condition comprises a condition when the commanded current is greater than a current limit for the power source; and
in response to identifying the undesired condition comprising the commanded current being greater than a current limit for the power source, setting the commanded current based on the current limit for the power source to reduce the undesired condition.

18. The method of claim 17, further comprising:
identifying the undesired condition when the motor is providing power to the power source, wherein the undesired condition comprises a condition when a voltage across the windings is greater than a first voltage threshold, wherein the first voltage threshold is defined with respect to an output voltage of the power source; and
in response to identifying the voltage across the windings being greater than the first voltage threshold, directing a current in the windings to ground via a resistor.

19. The method of claim 18, wherein the first voltage threshold is approximately equal to the output voltage of the power source.

20. The method of claim 18, further comprising:
identifying the undesired condition when the motor is providing power to the power source, wherein the undesired condition comprises a condition when the voltage across the windings is less than a second voltage threshold, wherein the second voltage threshold is lower than the first voltage threshold; and
in response to identifying the voltage across the windings being less than the second voltage threshold, ceasing directing the current in the windings to ground.

21. The method of claim 18, wherein the resistor is a variable resistor, the method further comprising:
selecting a resistance of the variable resistor in response to a level of the current in the windings.

22. The method of claim 21, wherein the resistor comprises a plurality of resistors in parallel, the method further comprising:
selecting a number of resistors in the plurality of resistors through which the current in the windings is directed to ground based on temperatures of the plurality of resistors.

23. The method of claim 21, wherein the current limit for the power source is variable and the power source comprises a battery, the method further comprising:

selecting a value for the current limit based on feedback from a cell balancer circuit for the battery.

* * * * *